United States Patent
Kim et al.

(10) Patent No.: US 12,531,094 B2
(45) Date of Patent: Jan. 20, 2026

(54) SEMICONDUCTOR MEMORY DEVICES AND MEMORY SYSTEMS INCLUDING THE SAME

(71) Applicant: Samsung Electronics Co., Ltd., Suwon-si (KR)

(72) Inventors: Junbae Kim, Suwon-si (KR); Geunhee Lee, Suwon-si (KR); Yoochang Sung, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 22 days.

(21) Appl. No.: 18/669,931

(22) Filed: May 21, 2024

(65) Prior Publication Data

US 2025/0218478 A1    Jul. 3, 2025

(30) Foreign Application Priority Data

Dec. 29, 2023  (KR) .................... 10-2023-0196048

(51) Int. Cl.
*G11C 7/10* (2006.01)
*G11C 17/18* (2006.01)

(52) U.S. Cl.
CPC .......... *G11C 7/1063* (2013.01); *G11C 7/1057* (2013.01); *G11C 17/18* (2013.01); *G11C 2207/2254* (2013.01)

(58) Field of Classification Search
CPC ..... G11C 7/1063; G11C 7/1057; G11C 17/18; G11C 2207/2254; G11C 5/04; G11C 7/1084
See application file for complete search history.

(56) References Cited

U.S. PATENT DOCUMENTS

| | | | |
|---|---|---|---|
| 7,557,603 B2 | 7/2009 | Pan | |
| 9,294,056 B2 | 3/2016 | Nobbe et al. | |
| 9,647,659 B1 | 5/2017 | Ahn et al. | |
| 9,779,039 B2 | 10/2017 | Grunzke | |

(Continued)

FOREIGN PATENT DOCUMENTS

| | | | | |
|---|---|---|---|---|
| CN | 110534140 A | * | 12/2019 | ........... G11C 7/1087 |
| KR | 20230068258 A | * | 5/2023 | ........... G11C 7/1057 |

(Continued)

*Primary Examiner* — Jay W. Radke
(74) *Attorney, Agent, or Firm* — Harness, Dickey & Pierce, P.L.C.

(57) ABSTRACT

A semiconductor memory device includes an external resistor in a board, and a plurality of memory dies mounted on the board and that are designated as a master die and slave dies. The memory dies are commonly connected to the external resistor. The master die performs a first impedance calibration operation and outputs a first done signal indicating completion of the first impedance calibration operation to the slave dies through a first impedance pad. Each of the slave dies includes a second impedance pad, and receives the first done signal through the second impedance pad, generates an identification signal based on the first done signal, performs a second impedance calibration operation sequentially with respect to the other slave dies based on the identification signal, and outputs a second done signal indicating completion of the second impedance calibration operation through the second impedance pad.

20 Claims, 17 Drawing Sheets

(56) References Cited

U.S. PATENT DOCUMENTS

| | | |
|---|---|---|
| 9,935,632 B1 | 4/2018 | Gans |
| 10,134,485 B2 | 11/2018 | Kim |
| 10,205,451 B1 | 2/2019 | Johnson |
| 10,276,220 B2 | 4/2019 | Jeon et al. |
| 10,325,671 B2 | 6/2019 | Kim et al. |
| 10,345,384 B2 | 7/2019 | Christophersen et al. |
| 10,361,699 B2 | 7/2019 | Lee et al. |
| 10,491,215 B2 | 11/2019 | Cho et al. |
| 10,868,519 B2 | 12/2020 | Gans |
| 10,935,620 B2 | 3/2021 | Das et al. |
| 2022/0165321 A1* | 5/2022 | Seo .................... G11C 11/4093 |
| 2023/0137651 A1 | 5/2023 | Gans |
| 2023/0142493 A1 | 5/2023 | Kim et al. |
| 2023/0147293 A1 | 5/2023 | Cho et al. |
| 2023/0420008 A1* | 12/2023 | Tian ................. G11C 29/50008 |
| 2023/0420009 A1* | 12/2023 | Tian .................... G11C 7/1063 |
| 2023/0420012 A1* | 12/2023 | Tian ................... G11C 11/4076 |
| 2024/0096409 A1* | 3/2024 | Tian ................... G11C 11/4093 |
| 2024/0290378 A1* | 8/2024 | Chung ............... G11C 11/4093 |

FOREIGN PATENT DOCUMENTS

| | | | | |
|---|---|---|---|---|
| TW | 202307847 A | * | 2/2023 | ......... G11C 11/4096 |
| WO | WO-2023245923 A1 | * | 12/2023 | ............... G11C 7/10 |

* cited by examiner

SEMICONDUCTOR MEMORY DEVICES AND MEMORY SYSTEMS INCLUDING THE SAME

CROSS-REFERENCE TO RELATED APPLICATION

This application claims priority under 35 U.S.C. § 119 to Korean Patent Application No. 10-2023-0196048, filed on Dec. 29, 2023 in the Korean Intellectual Property Office, the disclosure of which is incorporated by reference herein in its entirety.

BACKGROUND

Some example embodiments described herein relate to memory devices, and more particularly, to semiconductor memory devices including multi-dies and memory systems including the same.

As the operating speed of semiconductor memory devices has increased, swing width of signals (e.g., the range of values of the signals) interfaced between a semiconductor memory device and a memory controller has generally decreased. However, as swing width has decreased, signals transferred between the semiconductor memory device and the memory controller may be more easily distorted by impedance mismatch caused by process, voltage, and temperature (PVT) variations. An impedance calibration operation for adjusting output impedance and/or a termination impedance of the semiconductor memory device may be employed at transmitting and/or receiving stages of the semiconductor memory device. The impedance calibration operation may be referred to as an input/output (I/O) offset cancellation operation or a ZQ calibration operation.

SUMMARY

Some example embodiments of the inventive concepts provide a semiconductor memory device including multi-dies communicating with each other through impedance pads.

Some example embodiments provide a memory system that includes a semiconductor memory device including multi-dies communicating with each other through impedance pads.

Some example embodiments of the inventive concepts provide a semiconductor memory device that includes an external resistor in a board; and a plurality of memory dies mounted on the board. A first memory die from among the plurality of memory dies is designated as a master die, and memory dies from among the plurality of memory dies other than the first memory master are designated as a plurality of slave dies. The master die includes a first output driver and a first impedance pad, and performs a first impedance calibration operation to set a resistance of the first output driver and a first reference output high level (VOH) voltage of the first output driver, and outputs a first done signal indicating a completion of the first impedance calibration operation to the plurality of slave dies through the first impedance pad connected to the external resistor. Each of the plurality of slave dies includes a second output driver and a second impedance pad, and receives the first done signal through the second impedance pad connected to the external resistor, generates an identification signal based on the first done signal, performs a second impedance calibration operation to set a resistance of the second output driver and a second reference VOH voltage of the second output driver based on the identification signal, and outputs a second done signal indicating a completion of the second impedance calibration operation through the second impedance pad. A first slave die from among the plurality of slave dies performs the second impedance calibration operation based on a corresponding identification signal, and second slave dies from among the plurality of slave dies other than the first slave die sequentially perform the second impedance calibration operation after the first slave die based on corresponding identification signals.

Some example embodiments of the inventive concepts further provide a memory system that includes a semiconductor memory device including a plurality of memory dies; and a memory controller that controls the semiconductor memory device. The semiconductor memory device includes an external resistor in a board; and a plurality of memory dies mounted on the board and commonly connected to the external resistor. A first memory die from among the plurality of memory dies is designated as a master die, and memory dies from among the plurality of memory dies other than the first memory die are designated as a plurality of slave dies. The master die includes a first output driver and a first impedance pad, and performs a first impedance calibration operation to set a resistance of the first output driver and a first reference output high level (VOH) voltage of the first output driver, and outputs a first done signal indicating a completion of the first impedance calibration operation to the plurality of slave dies through the first impedance pad connected to the external resistor. Each of the plurality of slave dies includes a second output driver and a second impedance pad, and receives the first done signal through the second impedance pad connected to the external resistors, generates an identification signal based on the first done signal, performs a second impedance calibration operation to set a resistance of the second output driver and a second reference VOH voltage of the second output driver based on the identification signal, and outputs a second done signal indicating a completion of the second impedance calibration operation through the second impedance pad. The first slave die from among the plurality of slave dies performs the second impedance calibration operation based on a corresponding identification signal, and second slave dies from among the plurality of slave dies other than the first slave die sequentially perform the second impedance calibration operation after the first slave die based on corresponding identification signals.

Some example embodiments of the inventive concepts still further provide a semiconductor memory device that includes an external resistor in a board; and a plurality of memory dies mounted on the board. A first memory die from among the plurality of memory dies is designated as a master die, and memory dies from among the plurality of memory dies other than the first memory die are designated as a plurality of slave dies. The master die includes a first output driver and a first impedance pad, and performs a first impedance calibration operation to set a resistance of the first output driver and a first reference output high level (VOH) voltage of the first output driver, and outputs a first done signal indicating a completion of the first impedance calibration operation to the plurality of slave dies through the first impedance pad connected to the external resistor. Each of the plurality of slave dies includes a second output driver and a second impedance pad, and receives the first done signal through the second impedance pad connected to the external resistor, generates an identification signal based on the first done signal, performs a second impedance calibration operation to set a resistance of a second output driver and a second reference VOH voltage of the second output driver based on the identification signal, and outputs a second done signal indicating a completion of the second impedance calibration operation through the second impedance pad. The first slave die from among the plurality of slave dies performs the second impedance calibration operation based on a corresponding identification signal, and second slave dies from among the plurality of slave dies other than the first slave die sequentially perform the second impedance calibration operation after the first slave die based on corresponding identification signals. Each of the plurality of slave dies includes a level shifter, a ripple counter, a fuse set, an identifier generator and an impedance calibration circuit. The level shifter is connected to the second impedance pad, and outputs a shifted voltage by shifting a voltage at the second impedance pad. The ripple counter is connected to an internal power supply voltage, and outputs a counting signal by performing a counting operation based on the shifted voltage. Fuse information associated with a respective one of the plurality of slave dies is programmed in the fuse set and the fuse set outputs the programmed fuse information as a fuse signal. The identifier generator generates the identification signal that identifies the respective one of the plurality of slave dies based on the fuse signal and the counting signal. The impedance calibration circuit is connected to the second impedance pad, and performs the second impedance calibration operation.

Accordingly, the master die and the slave dies are provided on the same board, are commonly connected to an external resistor through each of impedance pads, and perform the impedance calibration operation sequentially by communicating with each other through the impedance pads. Therefore, the master die and the slave dies may limit and/or prevent degradation of power integrity due to board routing and electro-magnetic wave interference that may occur when communication pads are used for communicating between the master die and the slave dies by performing the impedance calibration operation sequentially by communicating with each other through the impedance pads.

BRIEF DESCRIPTION OF THE DRAWINGS

The above and other features of the present disclosure will be more clearly understood in view of the following detailed description of some example embodiments thereof with reference to the accompanying drawings.

DETAILED DESCRIPTION

Figure 1:
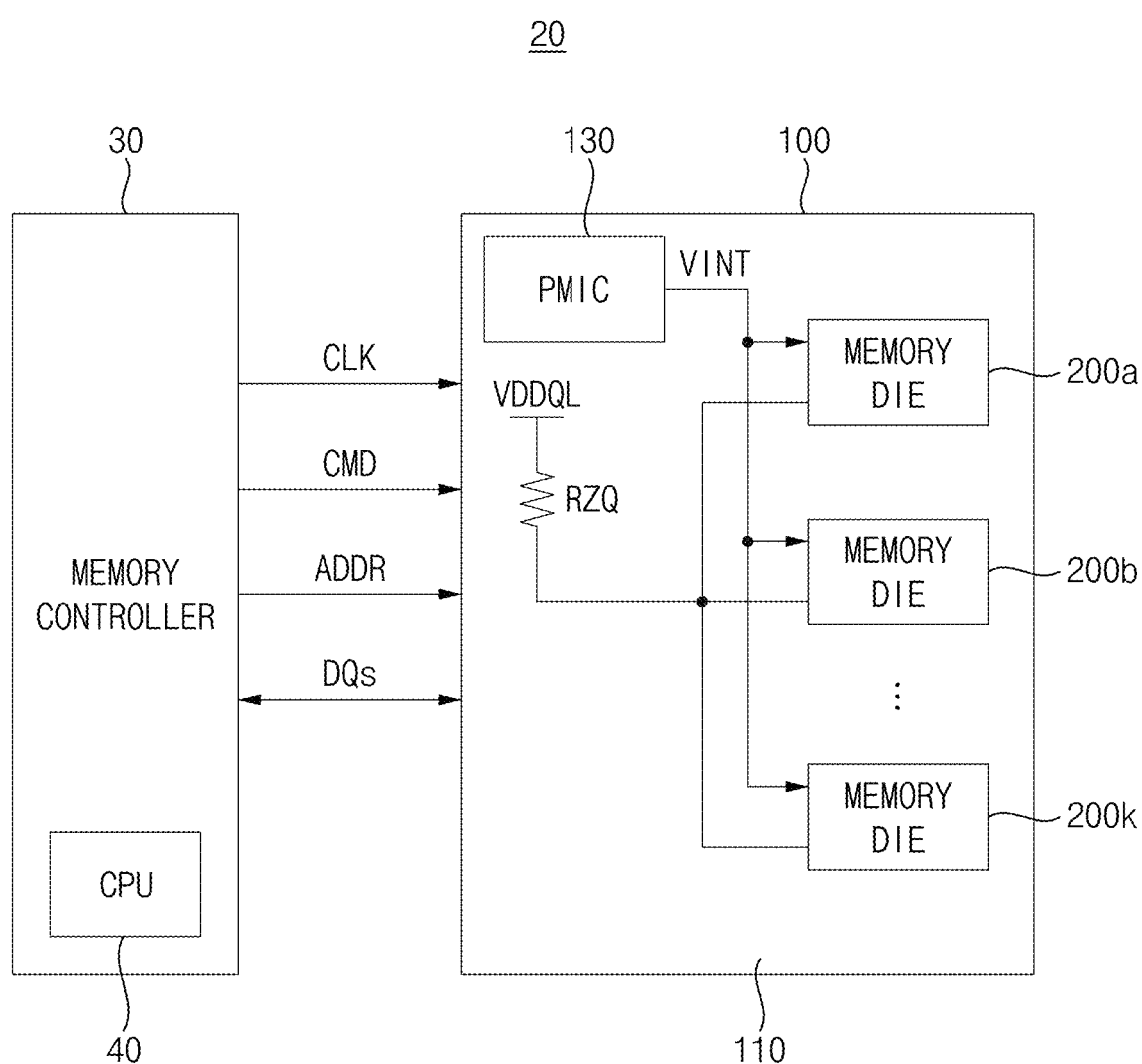
FIG. 1 is a block diagram illustrating a memory system according to some example embodiments.

Some example embodiments of the present disclosure will be described more fully hereinafter with reference to the accompanying drawings. Like reference numerals may refer to like elements throughout this application.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

Also, for example, "at least one of A, B, and C" and similar language (e.g., "at least one selected from the group consisting of A, B, and C") may be construed as A only, B only, C only, or any combination of two or more of A, B, and C, such as, for instance, ABC, AB, BC, and AC.

FIG. 1 is a block diagram illustrating a memory system according to some example embodiments.

Referring to FIG. 1, a memory system 20 may include a memory controller 30 and a semiconductor memory device 100. The semiconductor memory device 100 includes a plurality of memory dies 200a, 200b, . . . , 200k (which are denoted as 200a-200k, hereinafter), where k is an integer greater than two. In some example embodiments, each of the memory dies 200a-200k may be referred to as a memory chip. One (for example, the memory die 200a) of memory dies 200a-200k may be indicated by a master die and rest (for example, the memory dies 200b-200k) of the memory dies 200a-200k except the memory die 200 may be indicated as a plurality of slave dies.

The memory controller 30 may control an overall operation of the memory system 20. The memory controller 30 may control an overall data exchange between an external host and the plurality of memory dies 200a-200k. For example, the memory controller 30 may write data in the plurality of memory dies 200a-200k or read data from the plurality of memory dies 200a-200k in response to a request from the host. The memory controller 30 may issue operation commands to the plurality of memory dies 200a-200k for controlling the plurality of memory dies 200a-200k.

The memory controller 30 may transmit, to the memory dies 200a-200k, control signals such as a clock signal CLK, a command CMD, an address ADDR, and data signals DQs. The memory controller 30 may also receive the data signals DQs from the memory dies 200a-200k. The memory controller 30 may transmit a write command, a read command, and an impedance calibration command to each of the memory dies 200a-200k. Each of the memory dies 200a-200k may perform a write operation in response to the write command, a read operation in response to the read command, and an impedance calibration operation in response to the impedance calibration command.

In some example embodiments, each of the plurality of memory dies 200a-200k may be a dynamic random access memory (DRAM), such as a double data rate synchronous dynamic random access memory (DDR SDRAM), a low power double data rate synchronous dynamic random access memory (LPDDR SDRAM), or the like.

The plurality of memory dies 200a-200k may be commonly connected to an external resistor RZQ provided (or, formed) in a board 110. For example, board 110 may be a circuit board, a package substrate or an interposer. The external resistor RZQ may be connected to a power supply voltage VDDQL. In some example embodiments, the external resistor RZQ may be connected to a ground voltage.

The semiconductor memory device 100 may further include a power management integrated circuit (PMIC) 130.

The PMIC 130 may generate an internal power supply voltage VINT based on an input voltage (not illustrated) from the memory controller 30 and may provide the internal power supply voltage VINT to the memory dies 200a-200k.

The memory controller 30 may include a central processing unit (CPU) 40 to control operation of the memory controller 30.

The memory controller 30 may provide an impedance calibration command to the master die 200a from among the memory dies 200a-200k. The master die 200a may perform a first impedance calibration operation to determine (e.g., set) a resistance of a first output driver and a first reference output high level (VOH) voltage of the first output driver in response to the impedance calibration command and may broadcast (e.g., send or output) a first done signal indicating a completion of the first impedance calibration operation to the plurality of slave dies 200b-200k from among the memory dies 200a-200k through a first impedance pad.

Each of the slave dies 200b-200k may receive the first done signal through each of a plurality of second impedance pads and may perform a second impedance calibration operation to determine (e.g., set) a resistance of a second output driver and a second reference VOH voltage of the second output driver sequentially based on the first done signal and respective one of identification signals.

Figure 2:
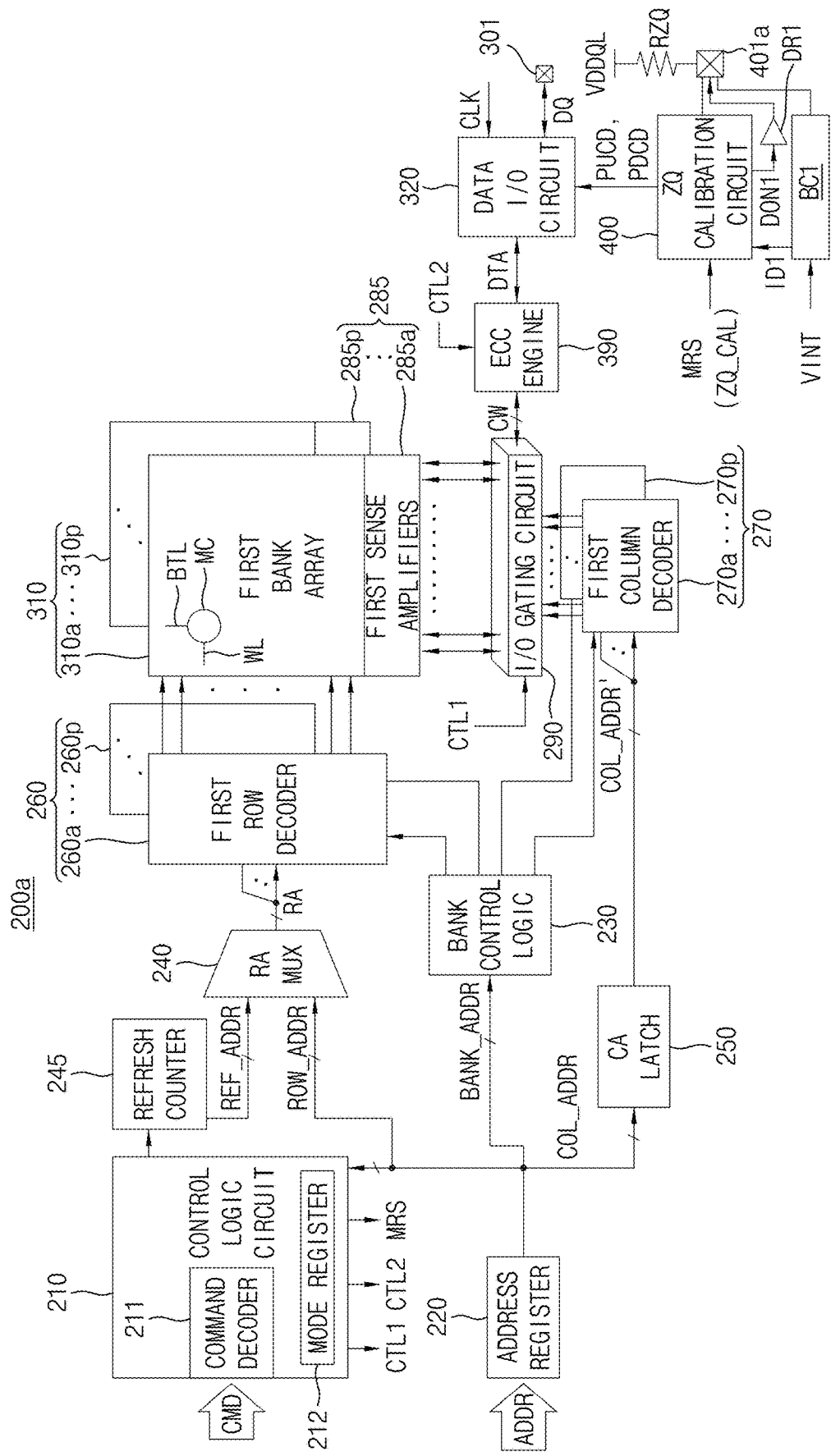
FIG. 2 is a block diagram illustrating an example of the master die in the semiconductor memory device in FIG. 1 according to some example embodiments.

FIG. 2 is a block diagram illustrating an example of the master die in the semiconductor memory device in FIG. 1 according to some example embodiments.

Referring to FIG. 2, the master die 200a may include a control logic circuit 210, an address register 220, a bank control logic 230, a row address multiplexer 240, a column address latch 250, a row decoder 260, a column decoder 270, a memory cell array 310, a sense amplifier unit 285, an input/output (I/O) gating circuit 290, a refresh counter 245, a data I/O circuit 320, an error correction code (ECC) engine 390, an impedance (ZQ) calibration circuit 400, a buffer circuit BC1 and a driver DR1.

The memory cell array 310 may include first through sixteenth bank arrays 310a-310p. The row decoder 260 may include first through sixteenth row decoders 260a-260p respectively coupled to the first through sixteenth bank arrays 310a-310p. The column decoder 270 may include first through sixteenth column decoders 270a-270p respectively coupled to the first through sixteenth bank arrays 310a-310p. The sense amplifier unit 285 may include first through sixteenth sense amplifiers 285a-285p respectively coupled to the first through sixteenth bank arrays 310a-310p. The first through sixteenth bank arrays 310a-310p, the first through sixteenth row decoders 260a-260p, the first through sixteenth column decoders 270a-270p, and first through sixteenth sense amplifiers 285a-285p may form first through sixteenth banks.

The first through eighth bank arrays 310a-310h, the first through eighth bank row decoders 260a-260h, the first through eighth bank column decoders 270a-270h, and the first through eighth bank sense amplifiers 285a-285h may form first through eighth banks. Each of the first through eighth bank arrays 310a-310h may include a plurality of memory cells MC, formed at intersections of a plurality of word-lines WL and a plurality of bit-line BTL.

Although the master die 200a is illustrated in FIG. 2 as including sixteen banks, some example embodiments of the present disclosure are not limited thereto, and the semiconductor memory device 200 may include any number of banks.

The address register 220 may receive the address ADDR including a bank address BANK_ADDR, a row address ROW_ADDR, and a column address COL_ADDR from the memory controller 30. The address register 220 may provide the received bank address BANK_ADDR to the bank control logic 230, provide the received row address ROW_ADDR to the row address multiplexer 240, and provide the received column address COL_ADDR to the column address latch 250.

The bank control logic 230 may generate bank control signals in response to the bank address BANK_ADDR. One of the first through sixteenth row decoders 260a-260p corresponding to the bank address BANK_ADDR may be activated in response to the bank control signals, and one of the first through sixteenth column decoders 270a-270p corresponding to the bank address BANK_ADDR may be activated in response to the bank control signals.

The row address multiplexer 240 may receive the row address ROW_ADDR from the address register 220, and may receive a refresh row address REF_ADDR from the refresh counter 245. The row address multiplexer 240 may selectively output one of the row address ROW_ADDR and the refresh row address REF_ADDR as a row address RA. The row address RA that is output from the row address multiplexer 240 may be applied to the first through sixteenth row decoders 260a-260p.

The refresh counter 245 may sequentially increase or decrease the refresh row address REF_ADDR under control of the control logic circuit 210.

The activated one of the first through sixteenth row decoders 260a-260p may decode the row address RA that is output from the row address multiplexer 240, and may activate a word-line corresponding to the row address RA. For example, the activated bank row decoder may apply a word-line driving voltage to the word-line corresponding to the row address RA.

The column address latch 250 may receive the column address COL_ADDR from the address register 220, and may temporarily store the received column address COL_ADDR. In some example embodiments, in a burst mode, the column address latch 250 may generate column addresses COL_ADDR' that increment from the received column address COL_ADDR. The column address latch 250 may apply the temporarily stored or generated column address COL_ADDR' to the first through sixteenth column decoders 270a-270p.

The activated one of the first through sixteenth column decoders 270a-270p may decode the column address COL_ADDR' that is output from the column address latch 250, and may control the I/O gating circuit 290 to output data corresponding to the column address COL_ADDR.

The I/O gating circuit 290 may include circuitry for gating input/output data. The I/O gating circuit 290 may further include read data latches for storing data that is output from the first through sixteenth bank arrays 310a-310p, and write drivers for writing data to the first through sixteenth bank arrays 310a-310p.

A codeword CW that is read from one bank array of the first through sixteenth bank arrays 310a-310p may be sensed by a sense amplifier coupled to the one bank array from which the data is to be read, and may be stored in the read data latches. The codeword CW stored in the read data latches may be provided to the ECC engine 390. The ECC engine 390 may perform an ECC decoding on the codeword CW to provide the data DTA to the data I/O circuit 320. The data I/O circuit 320 may convert the data DTA to the data signal DQ and may transmit the data signal DQ to the memory controller 30.

The data signal DQ to be written in one bank array of the first through sixteenth bank arrays 310a-310p may be provided to the data I/O circuit 320 from the memory controller 30. The data I/O circuit 320 may convert the data signal DQ to the data DTA and provide the data DTA to the ECC engine 390. The ECC engine 390 may perform an ECC encoding on the data DTA to generate parity bits and the ECC engine 390 may provide the data DTA and the parity bits to the I/O gating circuit 290. The I/O gating circuit 290 may write the data DTA and the parity bits in a sub-page in one bank array through the write drivers.

The data I/O circuit 320 may drive bits of the data DTA based on a pull-up control code PUCD and a pull-down control code PDCD from the impedance calibration circuit 400 to generate the data signal DQ having a target VOH level and provide the data signal DQ to the memory controller 30 through a data I/O pad 301.

The ECC engine 390 may perform an ECC encoding and ECC decoding on the data DTA based on a second control signal CTL2 from the control logic circuit 210.

The impedance calibration circuit 400 may be connected to the external resistor RZQ through an impedance (ZQ) pad 401a and the external resistor RZQ may be coupled to the power supply voltage VDDQL. In some example embodiments, the external resistor RZQ may be coupled to the ground voltage.

The impedance calibration circuit 400 may perform a first impedance calibration to generate a pull-up control code PUCD and a pull-down control code PDCD during an impedance calibration interval, in response to a mode register set signal MRS or an impedance calibration command ZQ_CAL and may provide the pull-up control code PUCD and a pull-down control code PDCD to a data output circuit in the data I/O circuit 320.

The buffer circuit BC1 may be connected to the impedance pad 401a, may receive the internal power supply voltage VINT, may generate an identification signal ID1 associated with the master die 200a and may provide the identification signal ID1 to the impedance calibration circuit 400.

The impedance calibration circuit 400 may provide the driver DR1 with a first done signal DON1 indicating a completion of the first impedance calibration operation. The driver DR1 may be connected to the impedance pad 401a and may broadcast the first done signal DON1 to the slave dies 200b-200k through the impedance pad 401a. The impedance pad 401a may be referred to as a first impedance pad.

The control logic circuit 210 may control operations of the master die 200a. For example, the control logic circuit 210 may generate control signals for the master die 200a in order to perform a write operation, a read operation or an impedance calibration operation. The control logic circuit 210 may include a command decoder 211 that decodes the command CMD received from the memory controller 300, and may include a mode register 212 that sets an operation mode of the master die 200a.

The command decoder 211 may generate the control signals corresponding to the command CMD by decoding a write enable signal, a row address strobe signal, a column address strobe signal, a chip select signal, etc. The control logic circuit 210 may generate a first control signal CTL1 to control the I/O gating circuit 290, may generate the second control signal CTL2 to control the ECC engine 390 and may generate the mode register set signal MRS to control the impedance calibration circuit 400.

Configuration of each of the slave dies 200b-200k may be substantially the same as or similar with configuration of the master die 200a of FIG. 2.

Figure 3:
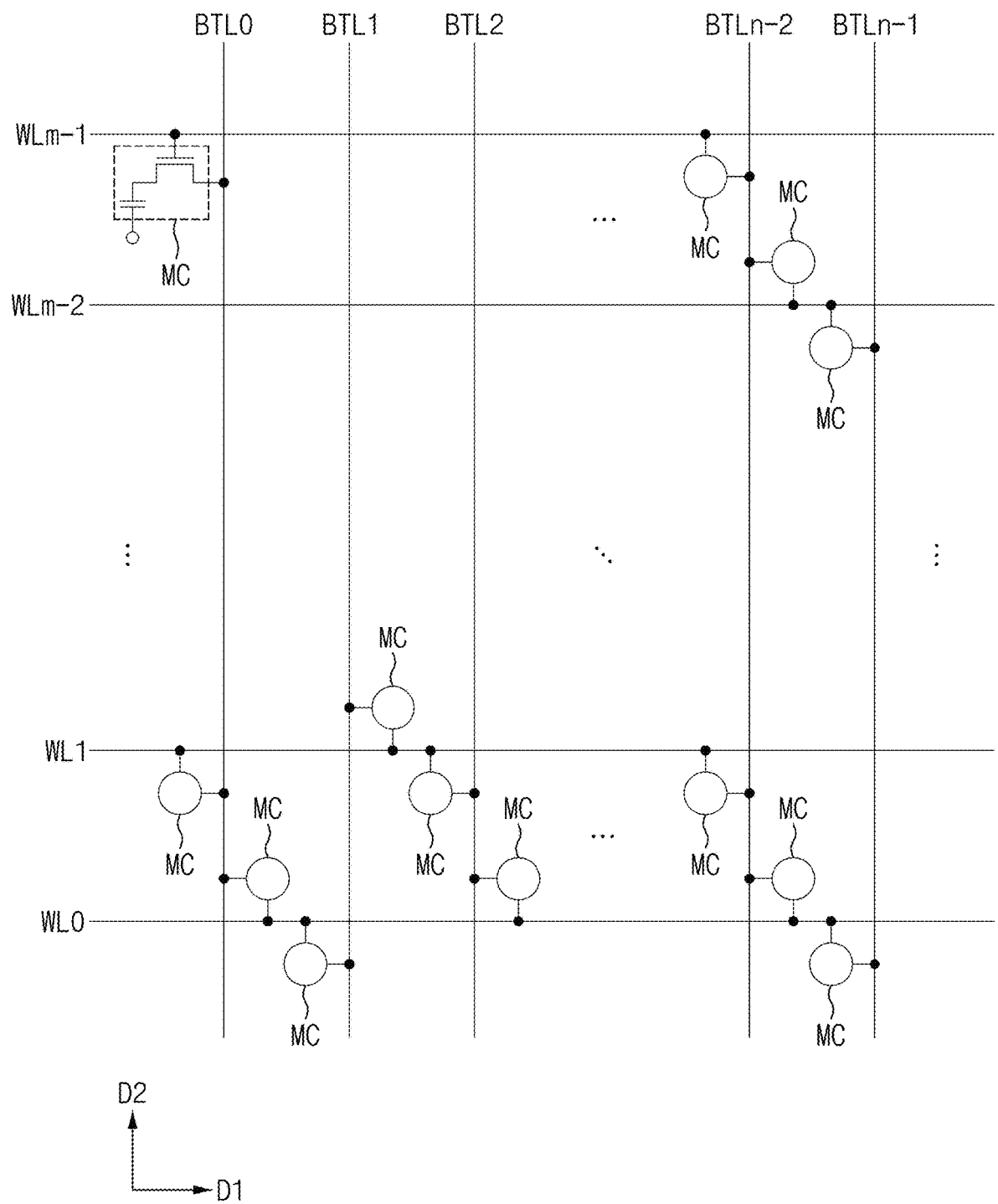
FIG. 3 illustrates an example of a first bank array in the master die of FIG. 2 according to some example embodiments.

FIG. 3 illustrates an example of a first bank array in the master die of FIG. 2 according to some example embodiments.

Referring to FIG. 3, the first bank array 310a may include a plurality of word-lines WL0~WLm−1 (m is a natural number greater than two), a plurality of bit-lines BTL0~BTLn−1 (n is a natural number greater than two), and a plurality of memory cells MCs disposed at intersections between the word-lines WL0~WLm−1 and the bit-lines BTL0~BTLn−1. Each of the memory cells MCs may include a cell transistor coupled to each of the word-lines WL0~WLm−1 and each of the bit-lines BTL0~BTLn−1 and a cell capacitor coupled to the cell transistor. Each of the memory cells MCs may have a DRAM cell structure. Each of the word-lines WL0~WLm−1 extends in a first direction D1 and each of the bit-lines BTL1~BTLn−1 extends in a second direction D2 crossing the first direction D1.

The word-lines WL0~WLm−1 coupled to the plurality of memory cells MCs may be referred to as rows of the first bank array 310a and the bit-lines BTL0~BTLn−1 coupled to the plurality of memory cells MCs may be referred to as columns of the first bank array 310a.

Figure 4:
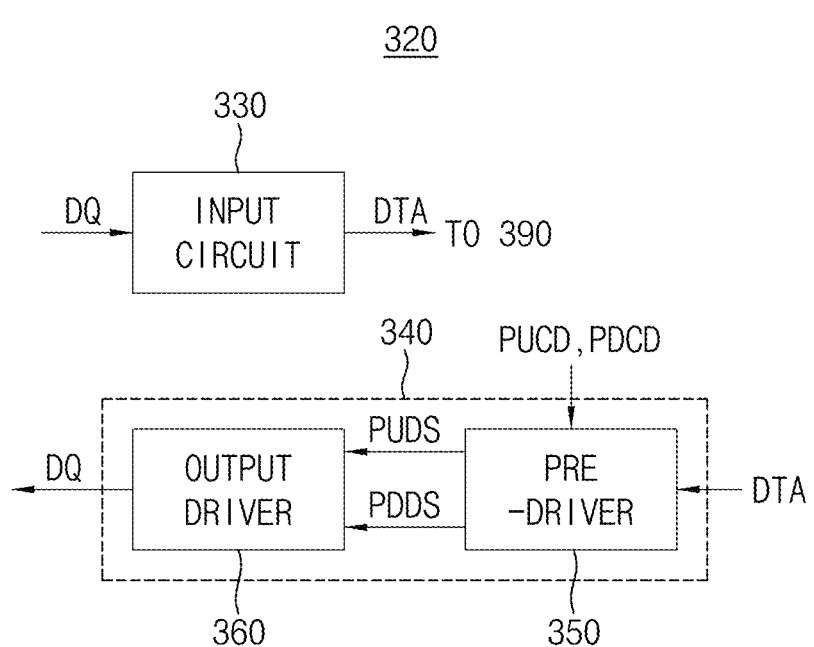
FIG. 4 illustrates an example of a data I/O circuit in the master die of FIG. 2 according to some example embodiments.

FIG. 4 illustrates an example of a data I/O circuit in the master die of FIG. 2 according to some example embodiments.

Referring to FIG. 4, the data I/O circuit 320 may include a data input circuit 330 and a data output circuit 340. The data output circuit 340 may include a pre-driver 350 and an output driver 360.

The data input circuit 330 may receive the data signal DQ from the memory controller 30, may convert the data signal DQ to the data DTA, and may provide the data DTA to the ECC engine 390. The data output circuit 340 may convert data DTA from the ECC engine 390 to the data signal DQ and provide the data signal DQ to the memory controller 30.

The pre-driver 350 may receive the data DTA, may generate a pull-up driving signal PUDS and a pull-down driving signal PDDS based on the pull-up control code PUCD and the pull-down control code PDCD, and may provide the pull-up driving signal PUDS and the pull-down driving signal PDDS to the output driver 360.

For example, when the data DTA is at a high level, the pre-driver 330 may buffer the pull-up control code PUCD and generate the pull-up driving signal PUDS to be substantially the same as the pull-up control code PUCD, and may generate the pull-down driving signal PDDS for turning off all transistors included in a pull-down driver (such as a pull-down driver 363 shown in FIG. 5) of the output driver 360. Contrarily, when the data DTA is at a low level, the pre-driver 330 may buffer the pull-down control code PDCD and generate the pull-down driving signal PDDS to be substantially the same as the pull-down control code PDCD, and generate the pull-up driving signal PUDS for turning off all transistors included in a pull-up driver (such as a pull-up driver 361 shown in FIG. 5) of the output driver 360. The pre-driver 350 may determine (e.g., set) a current generated by the pull-up driver 361 and a resistance of the pull-down driver 363 (shown in FIG. 5) when the output driver 360 outputs the data signal DQ.

Figure 5:
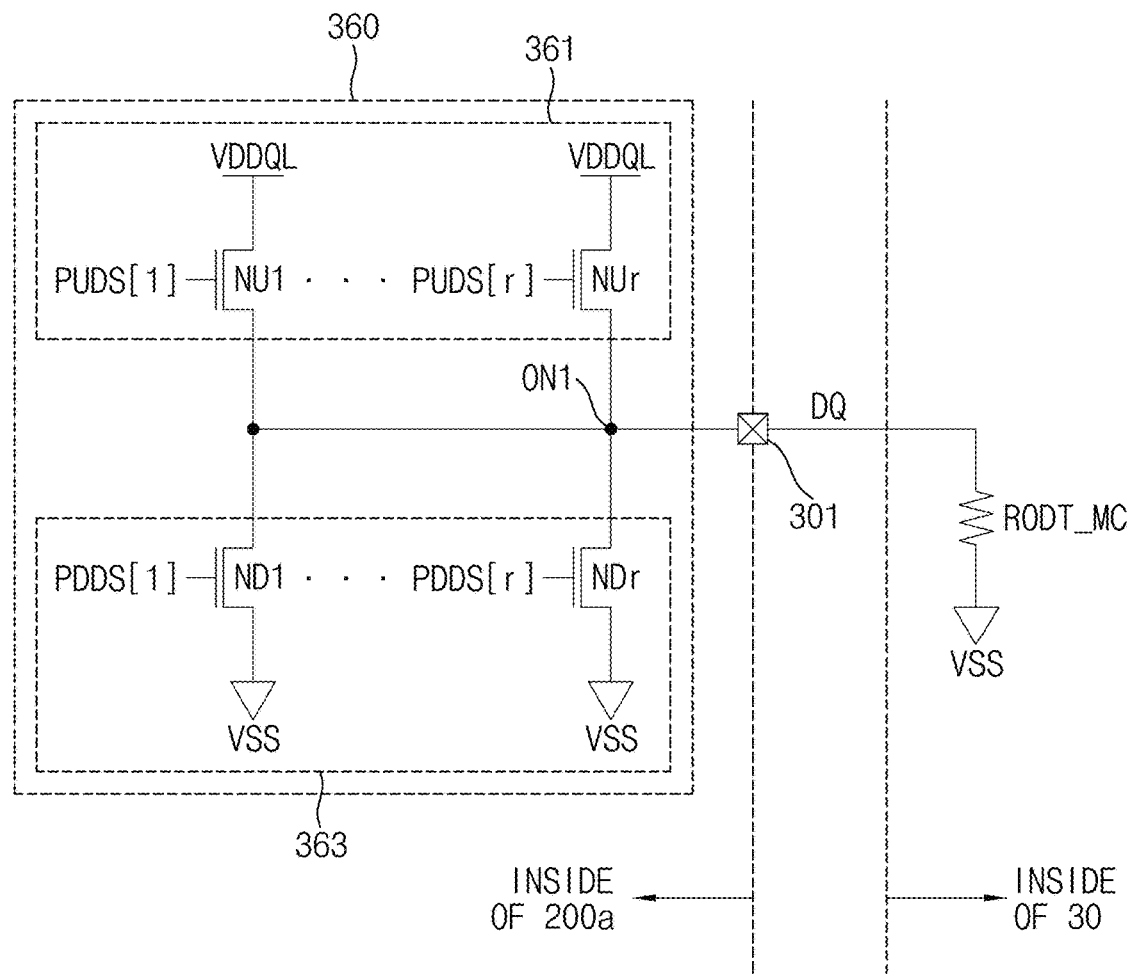
FIG. 5 is a circuit diagram illustrating an output driver in the data I/O circuit in FIG. 4 according to some example embodiments.

FIG. 5 is a circuit diagram illustrating an output driver in the data I/O circuit in FIG. 4 according to some example embodiments.

Referring to FIG. 5, the output driver 360 may include the pull-up driver 361 and the pull-down driver 363.

The pull-up driver 361 may include first through r-th (r is a natural number greater than one) pull-up transistors NU1 through NUr connected between the power supply voltage VDDQL and an output node ON1. Each of the first through r-th pull-up transistors NU1 through NUr may be an n-channel metal oxide semiconductor (NMOS) transistor.

The pull-down driver 363 may include first through r-th pull-down transistors ND1 through NDr connected between the output node ON1 and a ground voltage VSS. Each of the first through r-th pull-down transistors ND1 through NDr may be an NMOS transistor.

When the data DTA is at the high level, the pull-up driver 361 may receive the pull-up driving signal PUDS (e.g., PUDS[1] through PUDS[r]) corresponding to the pull-up control code PUCD from the pre-driver 350 and generate the current determined (e.g., set) by the pull-up control code PUCD. The pull-down transistors ND1 through NDr included in the pull-down driver 363 may all be turned off according to the pull-down driving signal PDDS (e.g., PDDS[1] through PDDS[r]).

When the data DTA is at the high level, the current generated by the pull-up driver 361 may be transmitted to an on-die termination (ODT) resistor RODT_MC in the memory controller 30 via the data I/O (or DQ) pad 301. The data signal DQ that the ODT resistor RODT_MC receives is determined by the current generated by the pull-up driver 361 and the ODT resistor RODT_MC, and has the target VOH voltage that has been adjusted according to the pull-up control code PUCD generated by the impedance calibration circuit 400. The target VOH voltage may be referred to as a reference VOH voltage.

When the data DTA is at the low level, the pull-up transistors NU1 through NUr included in the pull-up driver 361 may all be turned off according to the pull-up driving signal PUDS. The pull-down driver 363 may receive the pull-down driving signal PDDS corresponding to the pull-down control code PDCD from the pre-driver 330 and may have a resistance determined (e.g., set) by the pull-down control code PDCD.

When the data DTA is at the low level, no current is generated by the pull-up driver 361, and therefore, the data signal DQ that the ODT resistor RODT_MC receives has an output low level (VOL) voltage which is substantially the same as the ground voltage VSS.

According to some example embodiments, the total resistance, e.g., a termination resistance (RTT), of the pull-up driver 361 or the pull-down driver 363 may be changed in response to a particular pull-up or pull-down driving signal PUDS or PDDS. Single loading or double loading can be implemented by changing the number of memory modules inserted into a memory slot and an RTT appropriate to conditions can be selected.

Figure 6:
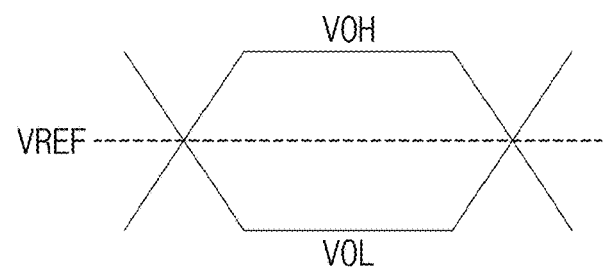
FIG. 6 illustrates a diagram for explaining an operation of a data output circuit in FIG. 5 according to some example embodiments.

FIG. 6 illustrates a diagram for explaining an operation of a data output circuit in FIG. 5 according to some example embodiments.

Referring to FIG. 6, the data signal DQ may have a high level or a low level according to the data DTA. The data signal DQ is an alternating current (AC) signal that swings between VOH and VOL.

The memory controller 30 may receive the data signal DQ from each of the memory dies 200a-200k, may determine the VOH and VOL voltages, and determine a reference voltage VREF from the VOH and VOL voltages. The memory controller 30 may compare the data signal DQ with the reference voltage VREF and may determine a received data value (e.g., 0 or 1).

Various process-voltage-temperature (PVT) conditions may be applied to each of the memory dies 200a-200k. The PVT conditions may include non-uniform doping in a wafer process, a voltage drop as current passes through different elements when power is supplied, and a temperature along a path through which a signal passes. AC on-resistance (hereinafter, referred to as "Ron AC") at the output side of the memory dies 200a-200k may vary with the PVT conditions, and the VOH voltage of the data signal DQ may vary with the Ron AC.

Various operating frequencies may be applied to each of the memory dies 200a-200k. When the operating frequency is changed, the VOH voltage of the data signal DQ may vary. Therefore, signal integrity of each of the memory dies 200a-200k may be enhanced by generating the pull-up control code PUCD and the pull-down control code PDCD according to the PVT conditions (e.g., operating parameters)

and the operating frequency, such that the data signal DQ has an optimum VOH voltage.

The impedance calibration circuit 400 may generate the pull-up control code PUCD and the pull-down control codes PDCD for various target VOH voltages, in response to the mode register set signal MRS or the impedance calibration command during the impedance calibration interval.

During a normal operation period, the impedance calibration circuit 400 may provide the data output circuit 360 with the pull-up control code PUCD and the pull-down control code PDCD for the target VOH voltage, and the data output circuit 360 may transmit the data signal DQ to the memory controller 30 based on the pull-up control code PUCD and the pull-down control code PDCD. The mode register set signal MRS may include information about the impedance of the ODT resistor RODT_MC of the memory controller 30 and may include information indicating whether to increase or decrease the VOH voltage of the data signal DQ.

Figure 7:
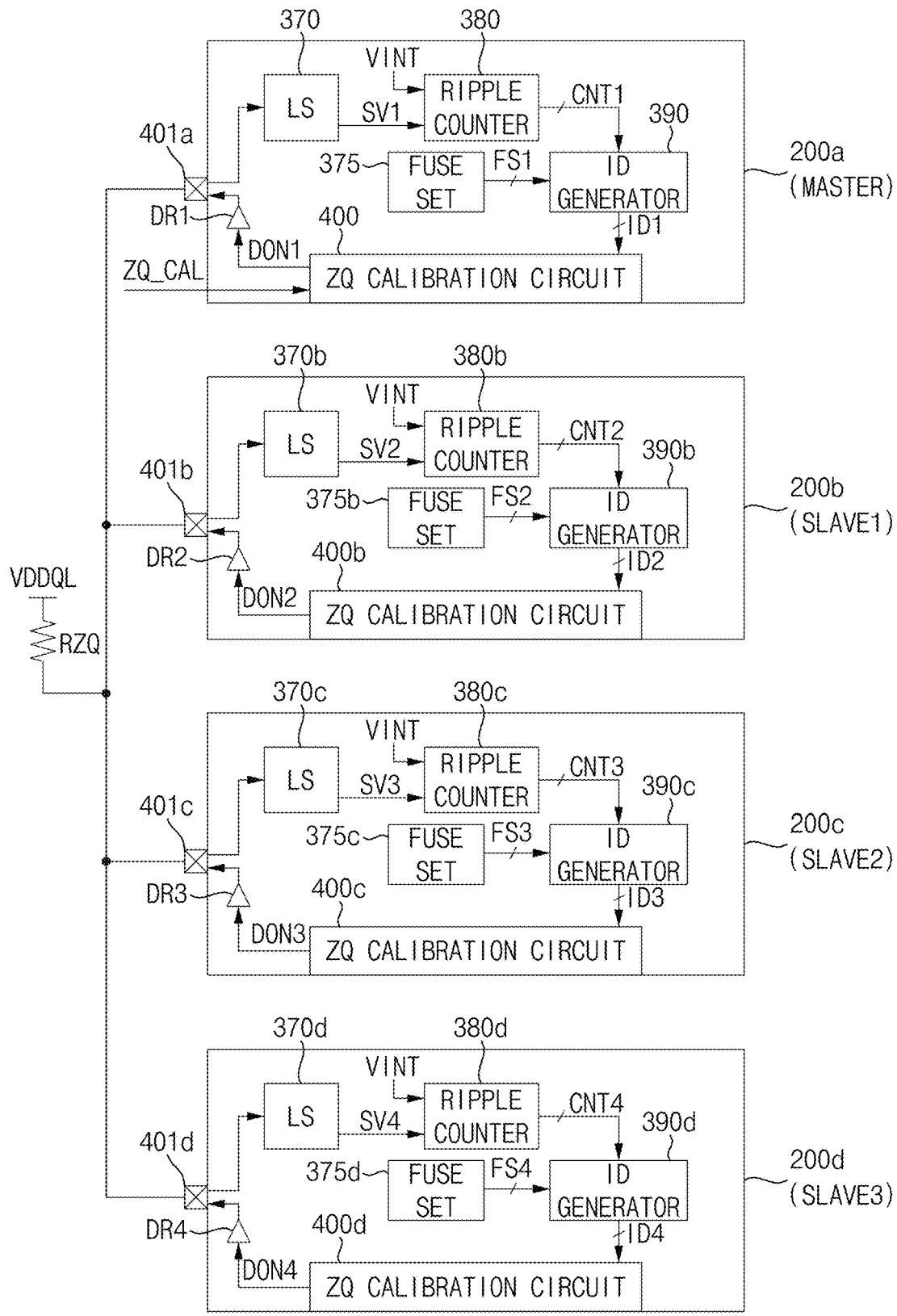
FIG. 7 illustrates a block diagram illustrating an example of the semiconductor memory device in the memory system of FIG. 1 according to some example embodiments.

FIG. 7 illustrates a block diagram illustrating an example of the semiconductor memory device in the memory system of FIG. 1 according to some example embodiments.

In FIG. 7, assuming that the semiconductor memory device include memory dies 200*a*, 200*b*, 200*c* and 200*d*, the memory die 200*a* is designated as a master die and the memory dies 200*b*, 200*c* and 200*d* are designated as slave dies.

Referring to FIG. 7, the master die 200*a* and the slave dies 200*b*, 200*c* and 200*d* may be connected to the external resistor RZQ connected to the power supply voltage VDDQL through a first impedance pad 401*a* and second impedance pads 401*b*, 401*c* and 401*d*, respectively.

The master die 200*a* may include a level shifter LS 370, a fuse set 375, a ripple counter 380, an identifier ID generator 390, the impedance calibration circuit 400 and the driver DR1.

The level shifter 370, the fuse set 375, the ripple counter 380 and the identifier generator 390 may constitute the buffer circuit BC1 in FIG. 2.

The level shifter 370 may connected to the first impedance pad 401*a*, and may output a shifted voltage SV1 to the ripple counter 380 by shifting a voltage of the first impedance pad 401*a*. That is, level shifter 370 may provide the shifted voltage SV1 (e.g., a digital voltage) to the ripple counter 380 by shifting the voltage (e.g., an analog voltage) of the first impedance pad 401*a*.

The ripple counter 380 may be connected to the internal power supply voltage VINT, may generate a counting signal CNT1 by performing a counting operation based on the shifted voltage SV1 and the internal power supply voltage VINT and may provide the counting signal CNT1 to the identifier generator 390.

Fuse information associated with the master die 200*a* (that is, fuse information designating the master die 200*a*) may be programmed in the fuse set 375 and the fuse set 375 may output the programmed fuse information as a fuse signal FS1 to the identifier generator 390.

The identifier generator 390 may receive the counting signal CNT1 and the fuse signal FS1, may generate an identification signal ID1 that identifies the master die 200*a* based on the counting signal CNT1 and the fuse signal FS1 and may provide the identification signal ID1 to the impedance calibration circuit 400.

The impedance calibration circuit 400 may receive the identification signal ID1 and the impedance calibration command ZQ_CAL, may ignore the identification signal ID1, may perform the first impedance calibration operation in response to the impedance calibration command ZQ_CAL and may broadcast the first done signal DON1 indicating a completion of the first impedance calibration operation to the slave dies 200*b*, 200*c* and 200*d* through the first impedance pad 401*a* when the first impedance calibration operation is completed.

Although not shown, a switch may be connected between the driver DR1 and the first impedance pad 401*a*. The switch may be turned-on (e.g., may connect the driver DR1 and the first impedance pad 401*a*) when the first done signal DON1 is activated and may be turned-off (e.g., may disconnect the driver DR1 from the first impedance pad 401*a*) in other cases. That is, the switch may connect the driver DR1 and the first impedance pad 401*a* in case of broadcasting the first done signal DON1 to the slave dies 200*b*, 200*c* and 200*d* and may disconnect the driver DR1 from the first impedance pad 401*a* in other cases.

Each of the slave dies 200*b*, 200*c* and 200*d* may receive the first done signal DON1 that the master die 200*a* broadcasts through respective one of the second impedance pads 401*b*, 401*c* and 401*d*.

The slave die 200*b* may include a level shifter 370*b*, a fuse set 375*b*, a ripple counter 380*b*, an identifier generator 390*b*, an impedance calibration circuit 400*b* and a driver DR2.

The level shifter 370*b*, the fuse set 375*b*, the ripple counter 380*b* and the identifier generator 390*b* may constitute a buffer circuit corresponding to the buffer circuit BC1 in FIG. 2.

The level shifter 370*b* may connected to the second impedance pad 401*b*, and may output a shifted voltage SV2 to the ripple counter 380*b* by shifting a voltage of the second impedance pad 401*b*. That is, level shifter 370*b* may provide the shifted voltage SV2 (e.g., a digital voltage) to the ripple counter 380*b* by shifting the voltage (e.g., an analog voltage) of the second impedance pad 401*b*.

The ripple counter 380*b* may be connected to the internal power supply voltage VINT, may generate a counting signal CNT2 by performing a counting operation based on the shifted voltage SV2 and the internal power supply voltage VINT and may provide the counting signal CNT2 to the identifier generator 390*b*.

Fuse information associated with the slave die 200*b* (that is, fuse information designating the slave die 200*b*) may be programmed in the fuse set 375*b* and the fuse set 375*b* may output the programmed fuse information as a fuse signal FS2 to the identifier generator 390*b*.

The identifier generator 390*b* may receive the counting signal CNT2 and the fuse signal FS2, may generate an identification signal ID2 that identifies the slave die 200*b* based on the counting signal CNT2 and the fuse signal FS2 and may provide the identification signal ID2 to the impedance calibration circuit 400*b*.

The impedance calibration circuit 400*b* may receive the identification signal ID2, may perform the second impedance calibration operation in response to activation of the identification signal ID2 and may broadcast a second done signal DON2 indicating a completion of the second impedance calibration operation through the second impedance pad 401*b* when the second impedance calibration operation is completed.

Although not shown, a switch may be connected between the driver DR2 and the second impedance pad 401*b*. The switch may be turned-on (e.g., may connect the driver DR2 and the second impedance pad 401*b*) when the second done signal DON2 is activated and may be turned-off (e.g., may disconnect the driver DR2 from the second impedance pad 401*b*) in other cases. That is, the switch may connect the driver DR2 and the second impedance pad 401*b* in case of broadcasting the second done signal DON2 and may disconnect the driver DR2 from the second impedance pad 401b in other cases.

The slave die 200c may include a level shifter 370c, a fuse set 375c, a ripple counter 380c, an identifier generator 390c, an impedance calibration circuit 400c and a driver DR3.

The level shifter 370c, the fuse set 375c, the ripple counter 380c and the identifier generator 390c may constitute a buffer circuit corresponding to the buffer circuit BC1 in FIG. 2.

The level shifter 370c may connected to the second impedance pad 401c, and may output a shifted voltage SV3 to the ripple counter 380c by shifting a voltage of the second impedance pad 401c. That is, level shifter 370c may provide the shifted voltage SV3 (e.g., a digital voltage) to the ripple counter 380c by shifting the voltage (e.g., an analog voltage) of the second impedance pad 401c.

The ripple counter 380c may be connected to the internal power supply voltage VINT, may generate a counting signal CNT3 by performing a counting operation based on the shifted voltage SV3 and the internal power supply voltage VINT and may provide the counting signal CNT3 to the identifier generator 390c.

Fuse information associated with the slave die 200c (that is, fuse information designating the slave die 200c) may be programmed in the fuse set 375c and the fuse set 375c may output the programmed fuse information as a fuse signal FS3 to the identifier generator 390c.

The identifier generator 390c may receive the counting signal CNT3 and the fuse signal FS3, may generate an identification signal ID3 that identifies the slave die 200c based on the counting signal CNT3 and the fuse signal FS3 and may provide the identification signal ID3 to the impedance calibration circuit 400c.

The impedance calibration circuit 400c may receive the identification signal ID3, may perform a second impedance calibration operation in response to activation of the identification signal ID3 and may broadcast a second done signal DON3 indicating a completion of the second impedance calibration operation through the second impedance pad 401c when the second impedance calibration operation is completed.

Although not shown, a switch may be connected between the driver DR3 and the second impedance pad 401c. The switch may be turned-on (e.g., may connect the driver DR3 and the second impedance pad 401c) when the second done signal DON3 is activated and may be turned-off (e.g., may disconnect the driver DR3 from the second impedance pad 401c) in other cases. That is, the switch may connect the driver DR3 and the second impedance pad 401c in case of broadcasting the second done signal DON3 and may disconnect the driver DR3 from the second impedance pad 401c in other cases.

The slave die 200d may include a level shifter 370d, a fuse set 375d, a ripple counter 380d, an identifier generator 390d, an impedance calibration circuit 400d and a driver DR4.

The level shifter 370d, the fuse set 375d, the ripple counter 380d and the identifier generator 390d may constitute a buffer circuit corresponding to the buffer circuit BC1 in FIG. 2.

The level shifter 370d may connected to the second impedance pad 401d, and may output a shifted voltage SV4 to the ripple counter 380d by shifting a voltage of the second impedance pad 401d. That is, level shifter 370d may provide the shifted voltage SV4 (e.g., a digital voltage) to the ripple counter 380d by shifting the voltage (e.g., an analog voltage) of the second impedance pad 401d.

The ripple counter 380d may be connected to the internal power supply voltage VINT, may generate a counting signal CNT4 by performing a counting operation based on the shifted voltage SV4 and the internal power supply voltage VINT and may provide the counting signal CNT4 to the identifier generator 390d.

Fuse information associated with the slave die 200d (that is, fuse information designating the slave die 200d) may be programmed in the fuse set 375d and the fuse set 375d may output the programmed fuse information as a fuse signal FS4 to the identifier generator 390d.

The identifier generator 390d may receive the counting signal CNT4 and the fuse signal FS4, may generate an identification signal ID4 that identifies the slave die 200d based on the counting signal CNT4 and the fuse signal FS4 and may provide the identification signal ID4 to the impedance calibration circuit 400d.

The impedance calibration circuit 400d may receive the identification signal ID4, may perform a second impedance calibration operation in response to activation of the identification signal ID4 and may broadcast a second done signal DON4 indicating a completion of the second impedance calibration operation through the second impedance pad 401d when the second impedance calibration operation is completed.

Although not shown, a switch may be connected between the driver DR4 and the second impedance pad 401d. The switch may be turned-on (e.g., may connect the driver DR4 and the second impedance pad 401d) when the second done signal DON4 is activated and may be turned-off (e.g., may disconnect the driver DR4 from the second impedance pad 401d) in other cases. That is, the switch may connect the driver DR4 and the second impedance pad 401d in case of broadcasting the second done signal DON4 and may disconnect the driver DR4 from the second impedance pad 401d in other cases.

Because the identification signals ID2, ID3 and ID4 are sequentially activated, the slave dies 200b, 200c and 200d may perform the second impedance calibration operations sequentially. For example, the slave die 200b may perform the second impedance calibration operation based on activated identification signal ID2, and thereafter the slave die 200c may perform the second impedance calibration operation based on the activated identification signal ID3, and thereafter the slave die 200d may perform the second impedance calibration operation based on the activated identification signal ID4. For example, a first slave die from among the slave dies 200b, 200c and 200d performs the second impedance calibration operation based on a corresponding identification signal, and second slave dies from among the slave dies 200b, 200c and 200d other than the first slave die sequentially perform the second impedance calibration operation after the first slave die based on corresponding identification signals.

Figure 8:
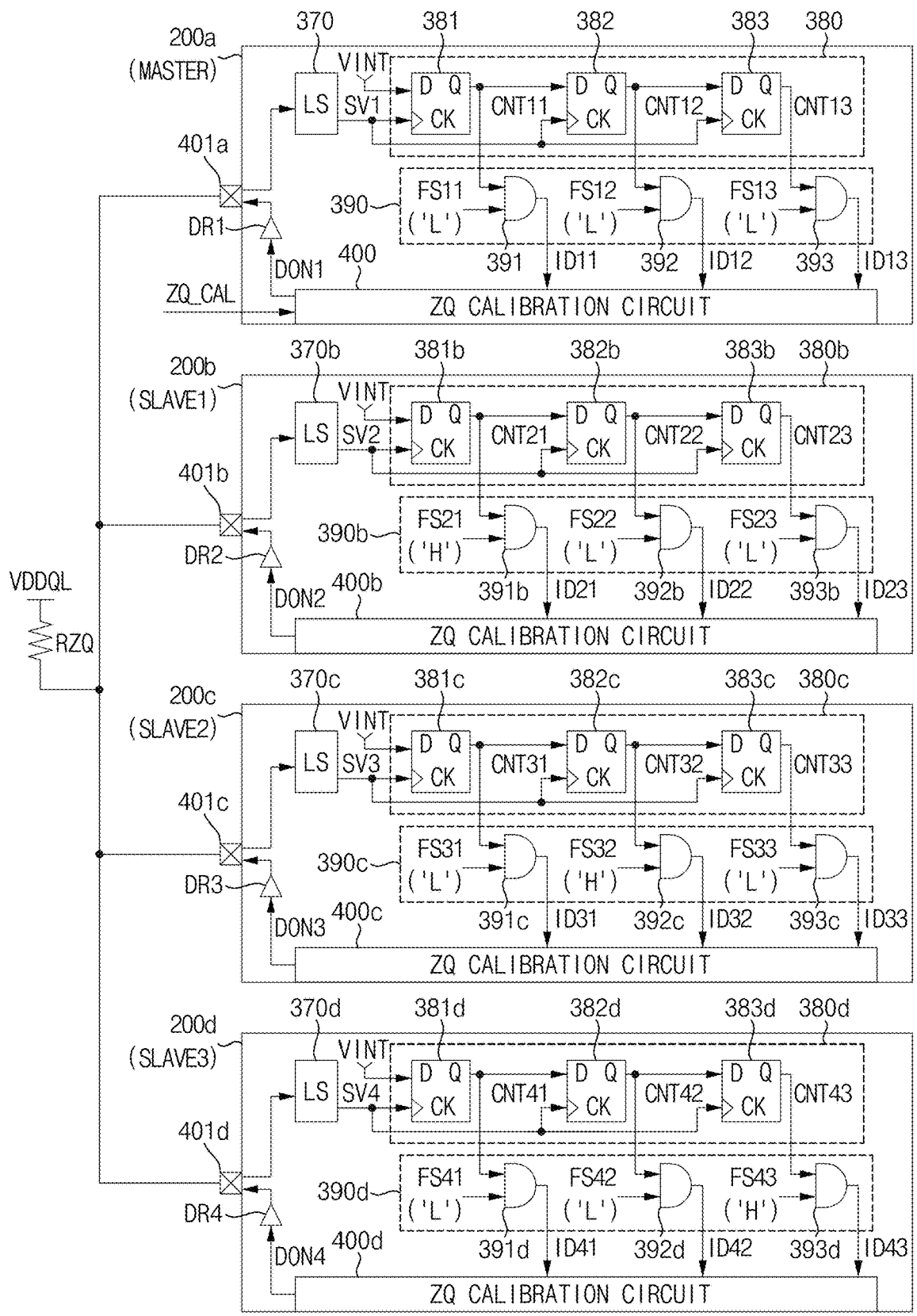
FIG. 8 is a circuit diagram illustrating memory dies in the semiconductor memory device of FIG. 7 according to some example embodiments.

FIG. 8 is a circuit diagram illustrating memory dies in the semiconductor memory device of FIG. 7 according to some example embodiments.

In FIG. 8, descriptions repeated with FIG. 7 will be omitted and the fuse sets 375, 375b, 375c and 375d are not illustrated for convenience of explanation.

Referring to FIG. 8, the ripple counter 380 of the master die 200a may include a first D-flipflop 381, a second D-flipflop 382 and a third D-flipflop 383.

The first D-flipflop 381 may include a data terminal D connected to the internal power supply voltage VINT, a clock terminal CK connected to the shifted voltage SV1 and an output terminal Q, and may output a first bit CNT11 of the counting signal CNT1 at the output terminal Q. The second D-flipflop 382 may include a data terminal D connected to the output terminal Q of the first D-flipflop 381, a clock terminal CK connected to the shifted voltage SV1 and an output terminal Q, and may output a second bit CNT12 of the counting signal CNT1 at the output terminal Q. The third D-flipflop 383 may include a data terminal D connected to the output terminal Q of the second D-flipflop 382, a clock terminal CK connected to the shifted voltage SV1 and an output terminal Q, and may output a third bit CNT13 of the counting signal CNT1 at the output terminal Q.

The identifier generator 390 in the master die 200a may include a first AND gate 391, a second AND gate 392 and a third AND gate 393.

The first AND gate 391 may output a first bit ID11 of the identification signal ID1 by performing an AND operation on the first bit CNT11 of the counting signal CNT1 and a first bit FS11 of the fuse signal FS1. The second AND gate 392 may output a second bit ID12 of the identification signal ID1 by performing an AND operation on the second bit CNT12 of the counting signal CNT1 and a second bit FS12 of the fuse signal FS1. The third AND gate 393 may output a third bit ID13 of the identification signal ID1 by performing an AND operation on the third bit CNT13 of the counting signal CNT1 and a third bit FS13 of the fuse signal FS1.

Because each of the first bit FS11, the second bit FS12 and the third bit FS13 of the fuse signal FS1 is a low level, each of the first bit ID11, the second bit ID12 and the third bit ID13 of the identification signal ID1 is a low level. Therefore, the impedance calibration circuit 400 of the master die 200a may perform the first impedance calibration operation in response to the impedance calibration command ZQ_CAL with ignoring the identification signal ID1 and may broadcast the first done signal DON1 indicating a completion of the first impedance calibration operation through the driver DR1 and the first impedance pad 401a.

The ripple counter 380b of the slave die 200b may include a first D-flipflop 381b, a second D-flipflop 382b and a third D-flipflop 383b.

The first D-flipflop 381b may include a data terminal D connected to the internal power supply voltage VINT, a clock terminal CK connected to the shifted voltage SV2 and an output terminal Q, and may output a first bit CNT21 of the counting signal CNT2 at the output terminal Q. The second D-flipflop 382b may include a data terminal D connected to the output terminal Q of the first D-flipflop 381b, a clock terminal CK connected to the shifted voltage SV2 and an output terminal Q, and may output a second bit CNT22 of the counting signal CNT2 at the output terminal Q. The third D-flipflop 383b may include a data terminal D connected to the output terminal Q of the second D-flipflop 382b, a clock terminal CK connected to the shifted voltage SV2 and an output terminal Q, and may output a third bit CNT23 of the counting signal CNT2 at the output terminal Q.

The identifier generator 390b in the slave die 200b may include a first AND gate 391b, a second AND gate 392b and a third AND gate 393b.

The first AND gate 391b may output a first bit ID21 of the identification signal ID2 by performing an AND operation on the first bit CNT21 of the counting signal CNT2 and a first bit FS21 of the fuse signal FS2. The second AND gate 392b may output a second bit ID22 of the identification signal ID2 by performing an AND operation on the second bit CNT22 of the counting signal CNT2 and a second bit FS22 of the fuse signal FS2. The third AND gate 393b may output a third bit ID23 of the identification signal ID2 by performing an AND operation on the third bit CNT23 of the counting signal CNT2 and a third bit FS23 of the fuse signal FS2.

Because the first bit FS21 of the fuse signal FS2 is a high level and each of the second bit FS22 and the third bit FS23 of the fuse signal FS2 is a low level, the first bit ID21 of the identification signal ID2 is a high level and each of the second bit ID22 and the third bit ID23 of the identification signal ID2 is a low level. Therefore, the impedance calibration circuit 400b of the slave die 200b may perform the second impedance calibration operation in response to activation of the first bit ID21 of the identification signal ID2 and may broadcast the second done signal DON2 indicating a completion of the second impedance calibration operation through the driver DR2 and the second impedance pad 401b.

The ripple counter 380c of the slave die 200c may include a first D-flipflop 381c, a second D-flipflop 382c and a third D-flipflop 383c.

The first D-flipflop 381c may include a data terminal D connected to the internal power supply voltage VINT, a clock terminal CK connected to the shifted voltage SV3 and an output terminal Q, and may output a first bit CNT31 of the counting signal CNT3 at the output terminal Q. The second D-flipflop 382c may include a data terminal D connected to the output terminal Q of the first D-flipflop 381c, a clock terminal CK connected to the shifted voltage SV3 and an output terminal Q, and may output a second bit CNT32 of the counting signal CNT3 at the output terminal Q. The third D-flipflop 383c may include a data terminal D connected to the output terminal Q of the second D-flipflop 382c, a clock terminal CK connected to the shifted voltage SV3 and an output terminal Q, and may output a third bit CNT33 of the counting signal CNT3 at the output terminal Q.

The identifier generator 390c in the slave die 200c may include a first AND gate 391c, a second AND gate 392c and a third AND gate 393c.

The first AND gate 391c may output a first bit ID31 of the identification signal ID3 by performing an AND operation on the first bit CNT31 of the counting signal CNT3 and a first bit FS31 of the fuse signal FS3. The second AND gate 392c may output a second bit ID32 of the identification signal ID3 by performing an AND operation on the second bit CNT32 of the counting signal CNT3 and a second bit FS32 of the fuse signal FS3. The third AND gate 393c may output a third bit ID33 of the identification signal ID3 by performing an AND operation on the third bit CNT33 of the counting signal CNT3 and a third bit FS33 of the fuse signal FS3.

Because the second bit FS32 of the fuse signal FS3 is a high level and each of the first bit FS31 and the third bit FS33 of the fuse signal FS3 is a low level, the second bit ID32 of the identification signal ID3 is a high level and each of the first bit ID31 and the third bit ID33 of the identification signal ID3 is a low level. Therefore, the impedance calibration circuit 400c of the slave die 200c may perform the second impedance calibration operation in response to activation of the second bit ID32 of the identification signal ID3 and may broadcast the second done signal DON3 indicating a completion of the second impedance calibration operation through the driver DR3 and the second impedance pad 401c.

The ripple counter 380d of the slave die 200d may include a first D-flipflop 381d, a second D-flipflop 382d and a third D-flipflop 383d.

The first D-flipflop 381d may include a data terminal D connected to the internal power supply voltage VINT, a clock terminal CK connected to the shifted voltage SV4 and an output terminal Q, and may output a first bit CNT41 of the counting signal CNT4 at the output terminal Q. The second D-flipflop 382d may include a data terminal D connected to the output terminal Q of the first D-flipflop 381d, a clock terminal CK connected to the shifted voltage SV4 and an output terminal Q, and may output a second bit CNT42 of the counting signal CNT4 at the output terminal Q. The third D-flipflop 383d may include a data terminal D connected to the output terminal Q of the second D-flipflop 382d, a clock terminal CK connected to the shifted voltage SV4 and an output terminal Q, and may output a third bit CNT43 of the counting signal CNT4 at the output terminal Q.

The identifier generator 390d in the slave die 200d may include a first AND gate 391d, a second AND gate 392d and a third AND gate 393d.

The first AND gate 391d may output a first bit ID41 of the identification signal ID4 by performing an AND operation on the first bit CNT41 of the counting signal CNT4 and a first bit FS41 of the fuse signal FS4. The second AND gate 392d may output a second bit ID42 of the identification signal ID4 by performing an AND operation on the second bit CNT42 of the counting signal CNT4 and a second bit FS42 of the fuse signal FS4. The third AND gate 393d may output a third bit ID43 of the identification signal ID4 by performing an AND operation on the third bit CNT43 of the counting signal CNT4 and a third bit FS43 of the fuse signal FS4.

Because the third bit FS43 of the fuse signal FS4 is a high level and each of the first bit FS41 and the second bit FS42 of the fuse signal FS4 is a low level, the third bit ID43 of the identification signal ID4 is a high level and each of the first bit ID41 and the second bit ID42 of the identification signal ID4 is a low level. Therefore, the impedance calibration circuit 400d of the slave die 200d may perform the second impedance calibration operation in response to activation of the third bit ID43 of the identification signal ID4 and may broadcast the second done signal DON4 indicating a completion of the second impedance calibration operation through the driver DR4 and the second impedance pad 401d.

Figure 9:
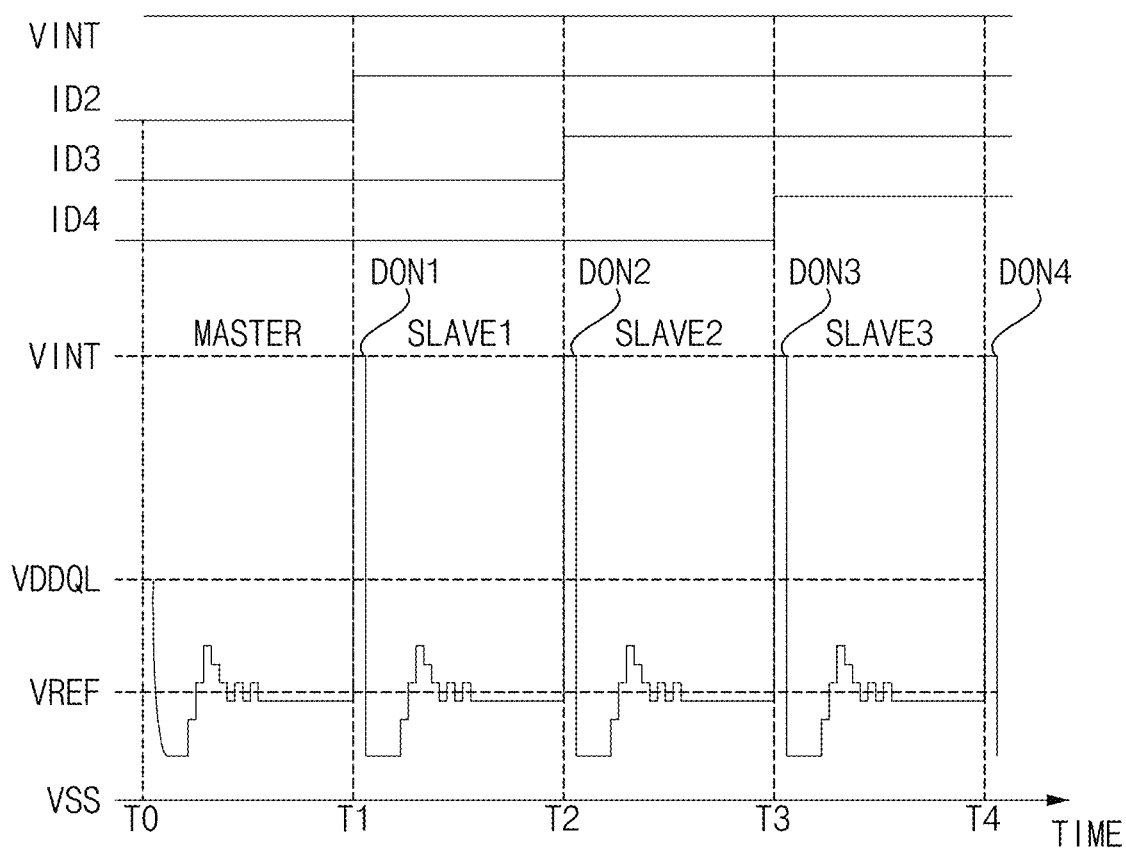
FIG. 9 is a timing diagram illustrating an impedance calibration operation of the semiconductor memory device of FIG. 8 according to some example embodiments.

FIG. 9 is a timing diagram illustrating an impedance calibration operation of the semiconductor memory device of FIG. 8 according to some example embodiments.

In FIG. 9, it is assumed that a voltage level of the internal power supply voltage VINT is greater than a voltage level of the power supply voltage VDDQL and the voltage level of the internal power supply voltage VINT is maintained.

Referring to FIGS. 8 and 9, during a time interval between time points T0 and T1, the master die 200a may perform a first impedance calibration operation in response to the impedance calibration command ZQ_CAL, and may broadcast the first done signal DON1 indicating a completion of the first impedance calibration operation through the first impedance pad 401a.

During a time interval between time points T1 and T2, the slave die (e.g., SLAVE1) 200b may perform a second impedance calibration operation in response to the identification signal ID2 that is activated at the time point T1 based on the fuse signal FS2 and a voltage of the second impedance pad 401b receiving the first done signal DON1, and may broadcast the second done signal DON2 indicating a completion of the second impedance calibration operation through the second impedance pad 401b.

During a time interval between time points T2 and T3, the slave die (e.g., SLAVE2) 200c may perform a second impedance calibration operation in response to the identification signal ID3 that is activated at the time point T2 based on the fuse signal FS3 and a voltage of the second impedance pad 401c receiving the second done signal DON2, and may broadcast the second done signal DON3 indicating a completion of the second impedance calibration operation through the second impedance pad 401c.

During a time interval between time points T3 and T4, the slave die (e.g., SLAVE3) 200d may perform a second impedance calibration operation in response to the identification signal ID4 that is activated at the time point T3 based on the fuse signal FS4 and a voltage of the second impedance pad 401d receiving the second done signal DON3, and may broadcast the second done signal DON4 indicating a completion of the second impedance calibration operation through the second impedance pad 401d.

In FIG. 9, in each of time intervals T0~T1, T1~T2, T2~T3 and T3~T4, a voltage swinging between the power supply voltage VDDQL and a ground voltage VSS with respect to a reference voltage VREF indicates that an impedance of the output driver 360 converges to a voltage level of the reference voltage VREF by each of the impedance calibration circuits 400, 400b, 400c and 400d performing a corresponding impedance calibration operation.

Figure 10:
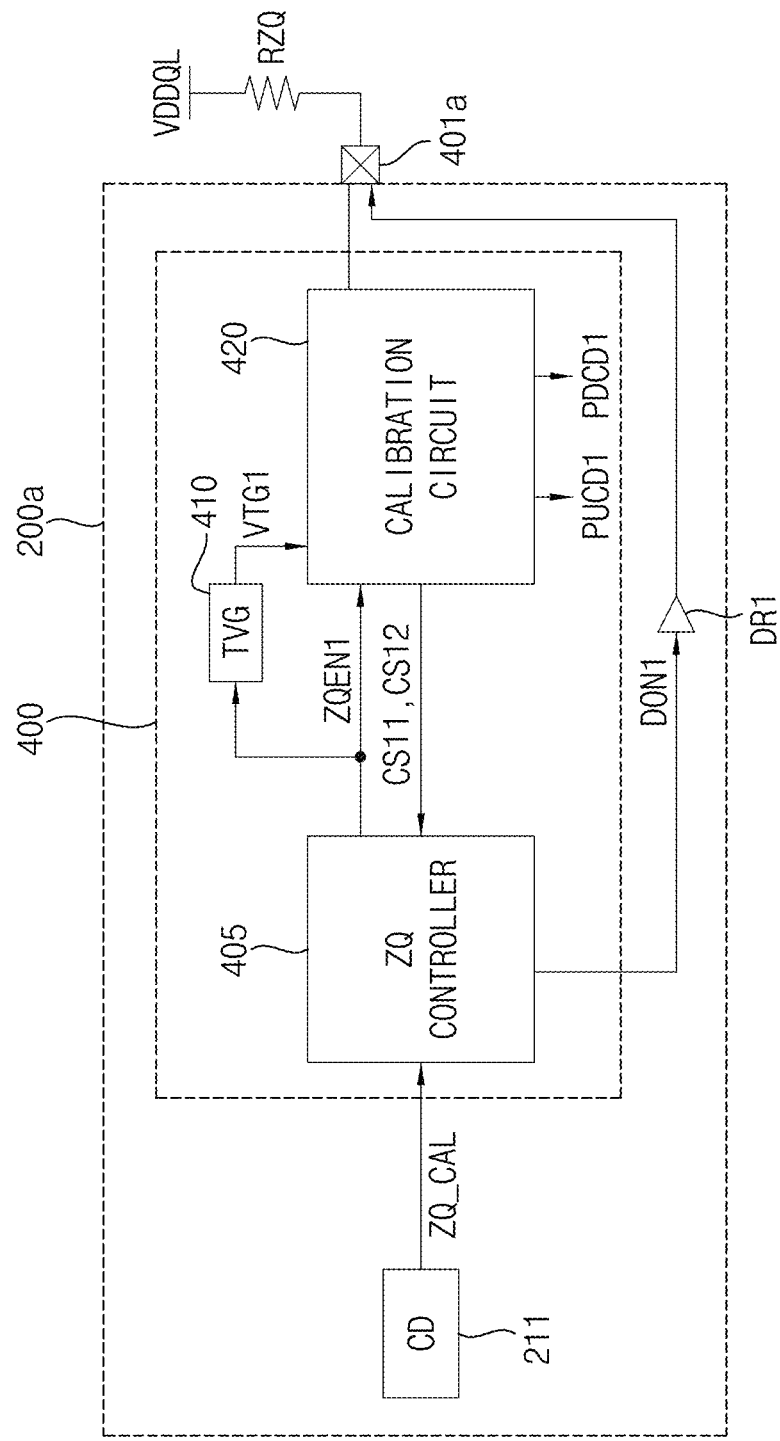
FIG. 10 illustrates a block diagram illustrating an impedance calibration circuit in the master die in FIG. 8 according to some example embodiments.

FIG. 10 illustrates a block diagram illustrating an impedance calibration circuit in the master die in FIG. 8 according to some example embodiments.

Referring to FIG. 10, the impedance calibration circuit 400 may include a calibration (ZQ) controller 405, a calibration circuit 420 and a target voltage generator TVG 410.

The calibration controller 405 may receive the impedance calibration command ZQ_CAL from the command decoder (e.g., a corresponding command decoder) 211 in the master die 200a.

The calibration circuit 420 may be connected to the external resistor RZQ through the first impedance pad 401a, may perform the first impedance calibration operation in response to a calibration enable signal ZQEN1 from the calibration controller 405 to provide a first pull-up control code PUCD1 and a first pull-down control code PDCD1 to the output driver 360, and may provide the calibration controller 405 with a first comparison signal CS11 and a second comparison signal CS12 indicating that the first impedance calibration operation is completed.

The target voltage generator 410 may generate a first target VOH voltage VTG1 in response to the calibration enable signal ZQEN1 and may provide the first target VOH voltage VTG1 to the calibration circuit 420.

The calibration controller 405 may broadcast the first done signal DON1 through the driver DR1 and the first impedance pad 401a based on the first comparison signal CS11 and the second comparison signal CS12 indicating that the first impedance calibration operation is completed.

Figure 11:
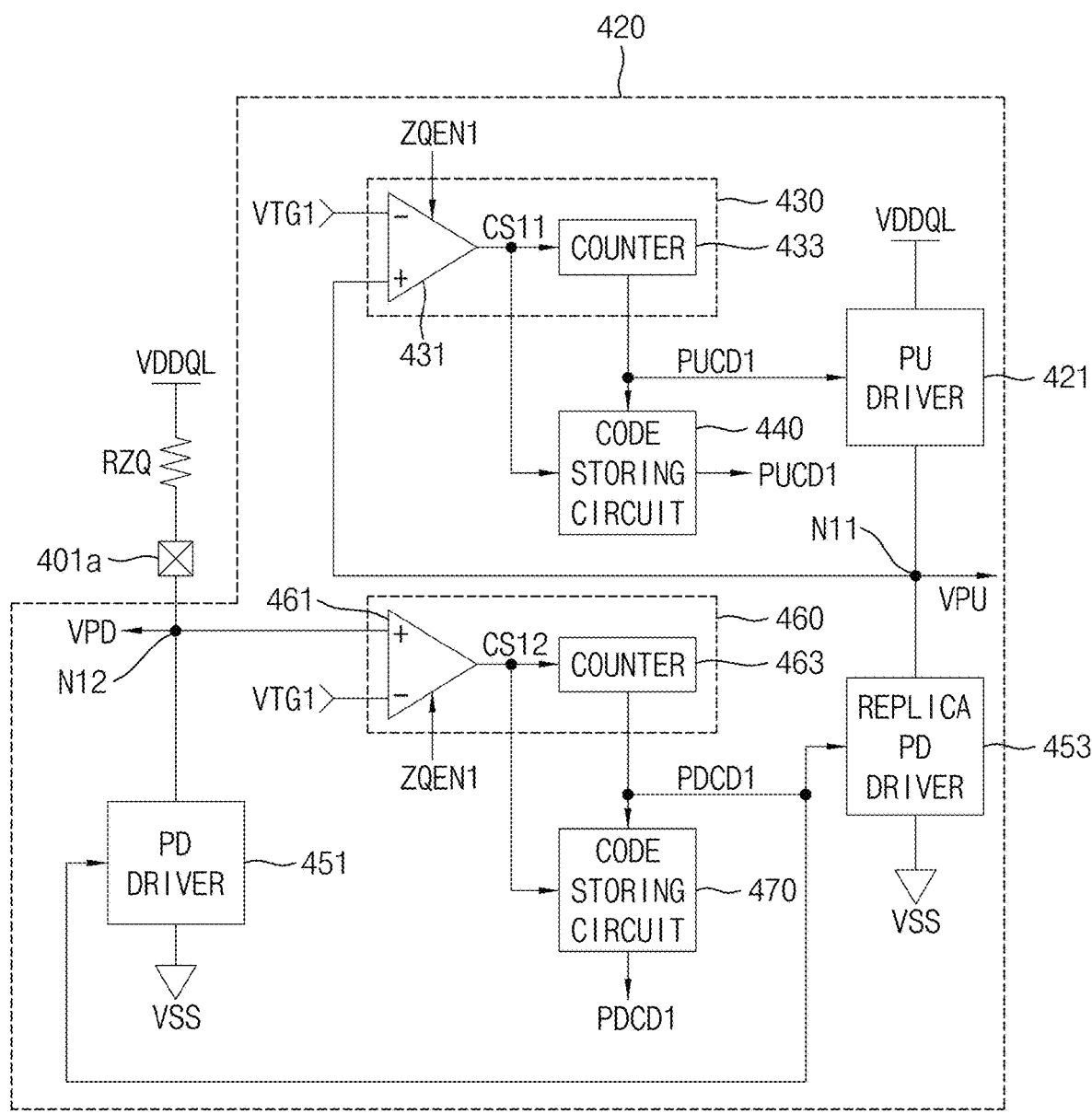
FIG. 11 illustrates a block diagram illustrating a calibration circuit in the impedance calibration circuit of FIG. 10 according to some example embodiments.

FIG. 11 illustrates a block diagram illustrating a calibration circuit in the impedance calibration circuit of FIG. 10 according to some example embodiments.

Referring to FIG. 11, the calibration circuit 420 may include a pull-up PU driver 421, a first code generator 430, a first code storing circuit 440, a pull-down PD driver 451, a replica pull-down PD driver 453, a second code generator 460, and a second code storing circuit 470.

The pull-up driver 421 may be connected between the power supply voltage VDDQL and a first node N11, and may have a configuration similar to the pull-up driver 361 in FIG. 5. The replica pull-down driver 453 may be connected between the first node N11 and the ground voltage VSS, and may have a configuration similar to the pull-down driver 363 in FIG. 5. The pull-down driver 451 may be connected between a second node N12 and the ground voltage VSS, and the second node N12 may be coupled to the first impedance pad 401a connected to the external resistor RZQ. The external resistor RZQ may be connected to the power supply voltage VDDQL. The pull-down driver 451 may have a configuration similar to the pull-down driver 363 in FIG. 5.

The first code generator 430 may generate the first pull-up control code PUCD1 obtained by comparing the first target VOH voltage VTG1 with a first voltage (or a pull-up voltage) VPU of the first node N11. The first code generator 430 may include a first comparator 431 and a first counter 433.

The first comparator 431 may be enabled in response to the calibration enable signal ZQEN1, may compare the first target VOH voltage VTG1 with the first voltage VPU to output the first comparison signal CS11, and may provide the first comparison signal CS11 to the first counter 433 and the first code storing circuit 440. The first counter 433 may perform a counting operation in response to the first comparison signal CS11 to generate the first pull-up control code PUCD1 and may perform a counting operation to increase or decrease the first pull-up control code PUCD1 until a logic level of the first comparison signal CS11 transits. The first counter 433 may provide the first pull-up control code PUCD1 to the pull-up driver 421 and the first code storing circuit 440.

The pull-up driver 421 may adjust/calibrate a pull-up impedance in response to the first pull-up control code PUCD1. The first pull-up control code PUCD1 may be calibrated and/or changed until the first target VOH voltage VTG1 becomes substantially the same as the pull-up voltage VPU.

The first code storing circuit 440 may store the first pull-up control code PUCD1 when the logic level of the first comparison signal CS11 transits. For example, the first code storing circuit 440 may store the first pull-up control code PUCD1 when the first target VOH voltage VTG1 becomes the pull-up voltage VPU.

The second code generator 460 may generate the first pull-down control code PDCD1 obtained by comparing a second voltage (or a pull-down voltage) VPD of the second node N12 with the first target VOH voltage VTG1. The second code generator 460 may include a second comparator 461 and a second counter 463. The second comparator 461 may be enabled in response to the calibration enable signal ZQEN1, may compare the first target VOH voltage VTG1 with the second voltage VPD to output the second comparison signal CS12 and may provide the second comparison signal CS12 to the second counter 463 and the second code storing circuit 470.

The second counter 463 may perform a counting operation in response to the second comparison signal CS2 to generate the first pull-down control code PDCD1 and may perform a counting operation to increase or decrease first the pull-down control code PDCD1 until a logic level of the second comparison signal CS2 transits. The second counter 463 may provide the first pull-down control code PDCD1 to the pull-down driver 451, the replica pull-down driver 453, and the second code storing circuit 470.

The pull-down driver 451 may adjust/calibrate a pull-down impedance in response to the first pull-down control code PDCD1. The replica pull-down driver 453 may adjust/calibrate a pull-down impedance in response to the first pull-down control code PDCD1. The first pull-down control code PDCD1 may be calibrated and/or changed until the pull-down voltage VPD becomes substantially the same as the first target VOH voltage VTG1. The second code storing circuit 470 may store the first pull-down control code PDCD1 when the logic level of the second comparison signal CS12 transits. For example, the second code storing circuit 470 may store the first pull-down control code PDCD1 when the pull-down voltage VPD becomes the first target VOH voltage VTG1.

The calibration circuit 420 provides the first comparison signal CS11 and the second comparison signal CS12 to the calibration controller 405 in FIG. 10.

Figure 12:
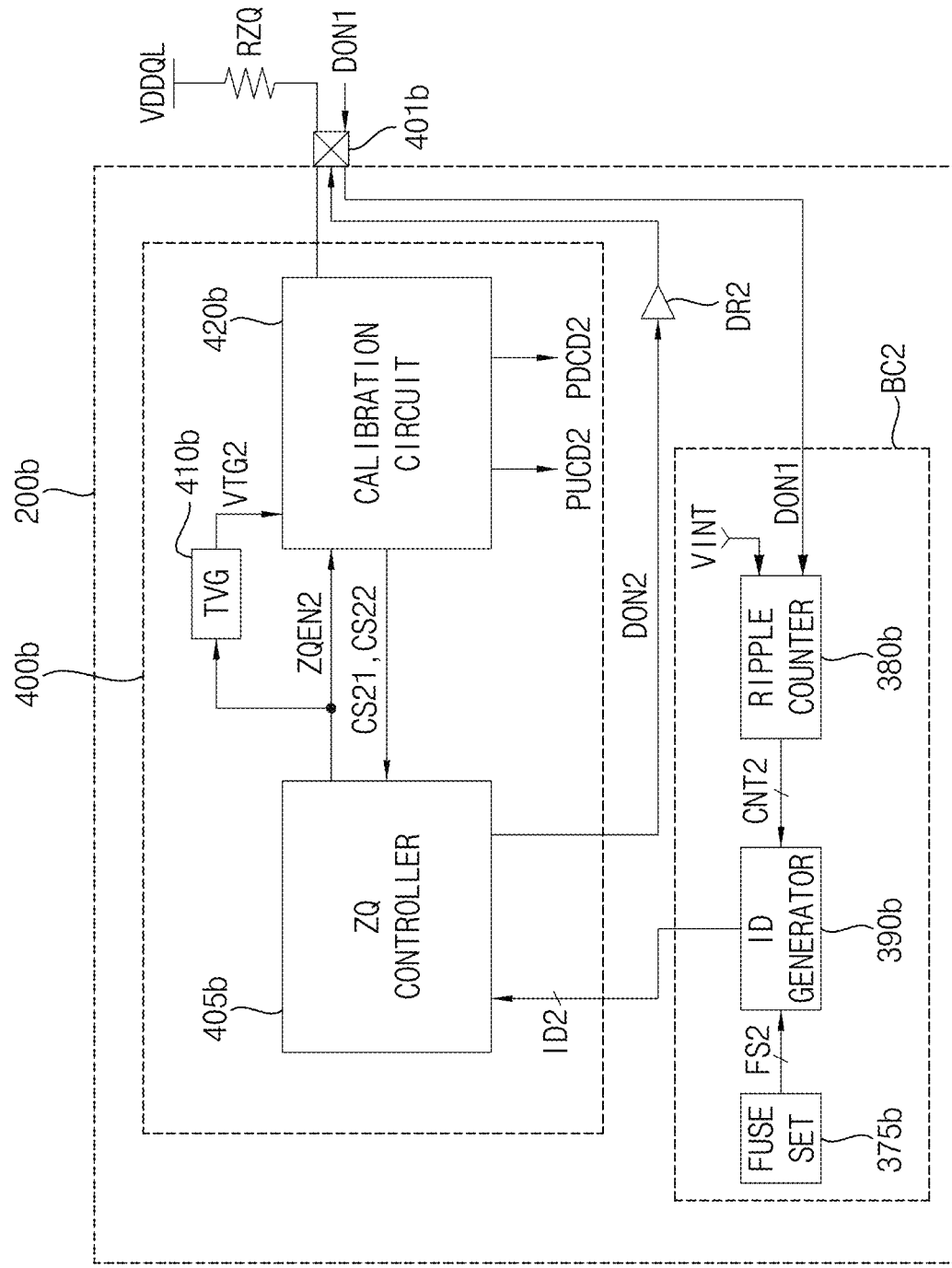
FIG. 12 illustrates a block diagram illustrating an impedance calibration circuit in the slave die in FIG. 8 according to some example embodiments.

FIG. 12 illustrates a block diagram illustrating an impedance calibration circuit in the slave die in FIG. 8 according to some example embodiments.

Referring to FIG. 12, the slave die 200b may include a buffer circuit BC2, the driver DR2 and the impedance calibration circuit 400b. The impedance calibration circuit 400b may be connected to the second impedance pad 401b and may include a calibration (ZQ) controller 405b, a calibration circuit 420b and a target voltage generator 410b.

The buffer circuit BC2 may include the fuse set 375b, the ripple counter 380b and the identifier generator 390b. The fuse set 375b may not be included in the buffer circuit BC2. The buffer circuit BC2 may provide the calibration controller 405b with the identification signal ID2 based on a voltage at the second impedance pad 401b. Repeated description of the fuse set 375b, the ripple counter 380b and the identifier generator 390b similar as described with respect to FIG. 8 will be omitted.

The calibration controller 405b may activate a calibration enable signal ZQEN2 in response to activation of the identification signal ID2 and may maintain an activated state of the calibration enable signal ZQEN2 during an impedance calibration interval.

The calibration circuit 420b may be connected to the external resistor RZQ through the second impedance pad 401b, may perform a second impedance calibration operation in response to the calibration enable signal ZQEN2 from the calibration controller 405b to provide a second pull-up control code PUCD2 and a second pull-down control code PDCD2 to a corresponding output driver (such as the output driver 360 in FIG. 4) of a data I/O circuit (such as the data I/O circuit 320 in FIG. 2) in the slave die 200b, and may provide the calibration controller 405b with a first comparison signal CS21 and a second comparison signal CS22 indicating that the second impedance calibration operation is completed.

The target voltage generator 410b may generate a second target VOH voltage VTG2 in response to the calibration enable signal ZQEN2 and may provide the second target VOH voltage VTG2 to the calibration circuit 420b.

The calibration controller 405b may broadcast the second done signal DON2 through the driver DR2 and the second impedance pad 401b based on the first comparison signal CS21 and the second comparison signal CS22 indicating that the second impedance calibration operation is completed.

Configuration and operation of the calibration circuit 420b may be substantially the same as or similar with configuration and operation of the calibration circuit 420 of FIG. 11.

That is, the calibration circuit 420b may include a pull-up driver, a first code generator, a first code storing circuit, a pull-down driver, a replica pull-down driver, a second code generator, and a second code storing circuit.

Figure 13:
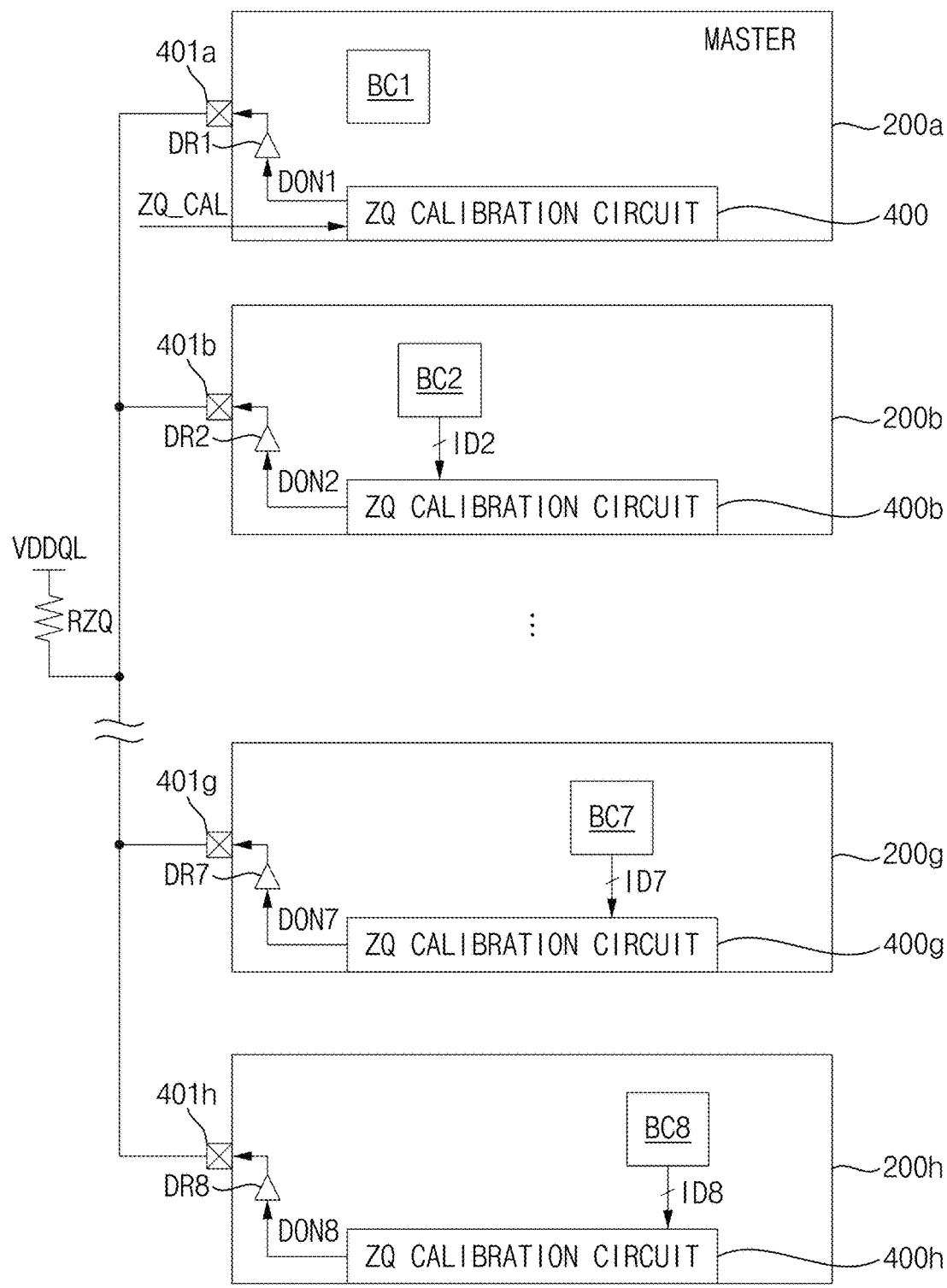
FIGS. 13 and 14 illustrate the impedance calibration operation performed in the semiconductor memory device in FIG. 1, according to some example embodiments.
Figure 14:
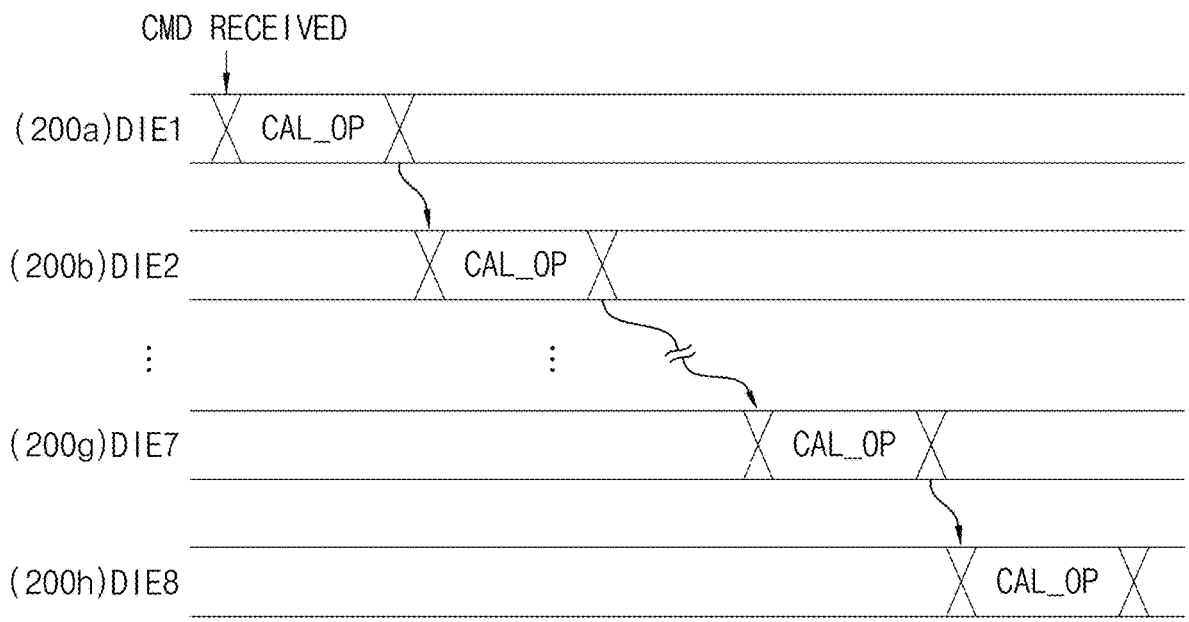

FIGS. 13 and 14 illustrate the impedance calibration operation performed in the semiconductor memory device in FIG. 1, according to some example embodiments.

In FIG. 13, it is assumed that the semiconductor memory device 100 in FIG. 1 is implemented with a semiconductor memory device 100b that includes the master die 200a and slave dies 200b-200h. Here, h is an integer greater than two.

Referring to FIG. 13, each of the master die 200a and the slave dies 200b-200h includes respective one of impedance pads 401a, 401b, . . . , 401g and 401h connected to the external resistor RZQ, and the master die 200a may include a buffer circuit BC1, an impedance calibration circuit 400 and a driver DR1.

The slave die 200b may include a buffer circuit BC2, an impedance calibration circuit 400b and a driver DR2, the slave die 200g may include a buffer circuit BC7, an impedance calibration circuit 400g and a driver DR7 and the slave die 200h may include a buffer circuit BC8, an impedance calibration circuit 400h and a driver DR8.

Referring to FIG. 14, the master die 200a (e.g., DIE1) may receive the impedance calibration command ZQ_CAL from the memory controller 30 during an initialization sequence, may perform an impedance calibration operation CAL_OP, and may broadcast the first done signal DON1 indicating completion of the impedance calibration operation CAL_OP through the driver DR1 and the impedance pad 401a.

The impedance calibration circuit 400b in the slave die 200b (e.g., DIE2) may perform an impedance calibration operation CAL_OP based on the identification signal ID2 and a voltage at the impedance pad 401b receiving the done signal DON1 and may broadcast the done signal DON2 indicating completion of the impedance calibration operation CAL_OP through the driver DR2 and the impedance pad 401b.

The impedance calibration circuit 400g in the slave die 200g (e.g., DIE7) may perform an impedance calibration operation CAL_OP based on an identification signal ID7 from the buffer circuit BC7 and a voltage at the impedance pad 401g receiving the done signal and may broadcast a done signal DON7 indicating completion of the impedance calibration operation CAL_OP through the driver DR7 and the impedance pad 401g.

The impedance calibration circuit 400h in the slave die 200h (e.g., DIE8) may perform an impedance calibration operation CAL_OP based on an identification signal ID8 from the buffer circuit BC8 and a voltage at the impedance pad 401h receiving the done signal and may broadcast a done signal DON8 indicating completion of the impedance calibration operation CAL_OP through the driver DR8 and the impedance pad 401h.

Figure 15:
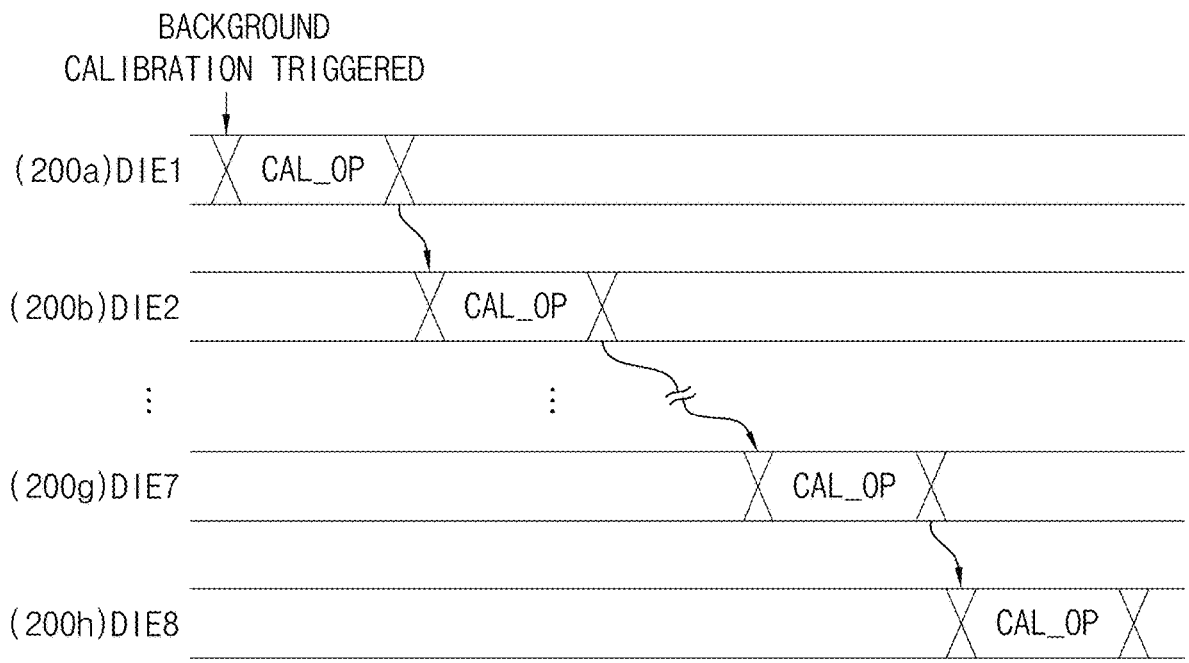
FIG. 15 illustrates a background impedance calibration operation performed during the idle period in the semiconductor memory device in FIG. 13, according to some example embodiments.

FIG. 15 illustrates a background impedance calibration operation performed during an idle period in the semiconductor memory device in FIG. 13, according to some example embodiments.

Referring to FIG. 15, the master die 200a activates the calibration enable signal ZQEN1 internally based on setting of the mode register 212, may perform a background impedance calibration operation CAL_OP, and may broadcast the first done signal DON1 indicating completion of the impedance calibration operation CAL_OP through the driver DR1 and the impedance pad 401a.

The impedance calibration circuit 400b in the slave die 200b (e.g., DIE2) may perform a background impedance calibration operation CAL_OP based on the identification signal ID2 and a voltage at the impedance pad 401b receiving the done signal DON1 and may broadcast the done signal DON2 indicating completion of the background impedance calibration operation CAL_OP through the driver DR2 and the impedance pad 401b.

The impedance calibration circuit 400g in the slave die 200g (e.g., DIE7) may perform a background impedance calibration operation CAL_OP based on an identification signal ID7 from the buffer circuit BC7 and a voltage at the impedance pad 401g receiving the done signal and may broadcast a done signal DON7 indicating completion of the background impedance calibration operation CAL_OP through the driver DR7 and the impedance pad 401g.

The impedance calibration circuit 400h in the slave die 200h (e.g., DIE8) may perform a background impedance calibration operation CAL_OP based on an identification signal ID8 from the buffer circuit BC8 and a voltage at the impedance pad 401h receiving the done signal and may broadcast a done signal DON8 indicating completion of the background impedance calibration operation CAL_OP through the driver DR8 and the impedance pad 401h.

As described with reference to FIGS. 1 and 14, the master die 200a and the slave dies 200b-200k may be provided (formed) in the same board 110, may be commonly connected to the external resistor RZQ through respective ones of impedance pads and may perform the impedance calibration operation sequentially by communicating with each other through the impedance pads. Therefore, the semiconductor memory device 100 may limit and/or prevent degradation of power integrity due to board routing and electromagnetic wave interference that may occur when communication pads are used for communicating between the master die 200a and the slave dies 200b-200k by performing the impedance calibration operation sequentially by communicating with each other through the impedance pads.

Figure 16:
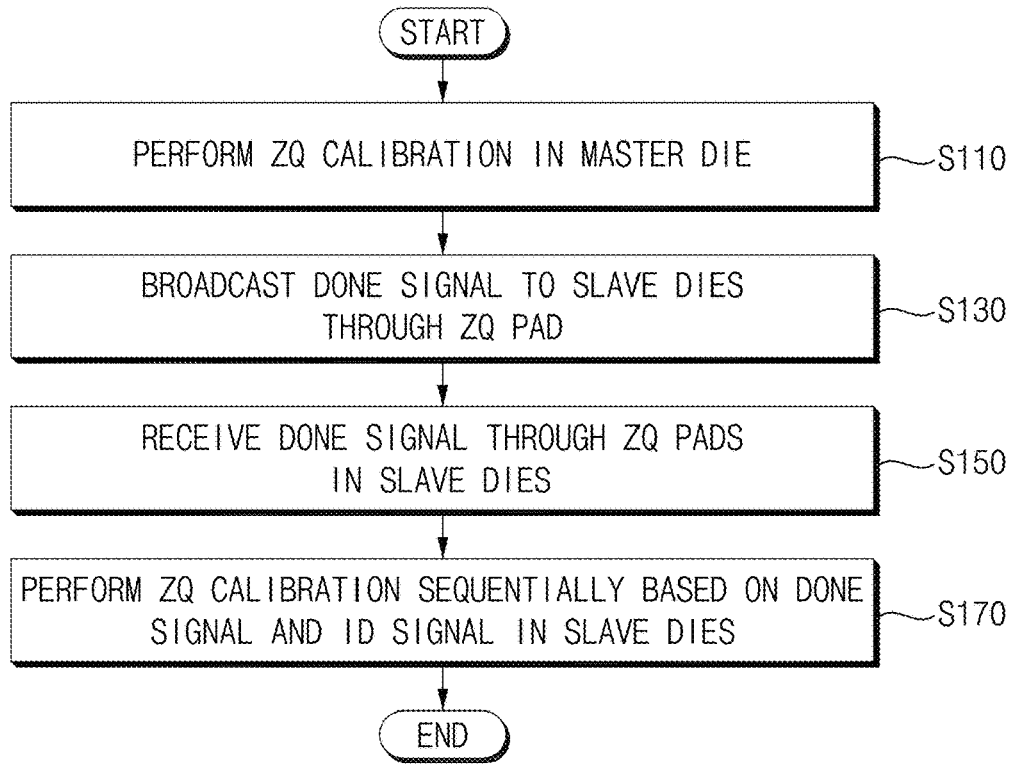
FIG. 16 is a flowchart illustrating a method of operating a semiconductor memory device including multi-dies according to some example embodiments.

FIG. 16 is a flowchart illustrating a method of operating a semiconductor memory device including multi-dies according to some example embodiments.

Referring to FIGS. 1 through 16, there is provided a method of operating the semiconductor memory device 100 including the master die 200a and the plurality of slave dies 200b-200k which are commonly connected to the external resistor RZQ provided in the board 110. According to the method, the master die 200a performs a first impedance calibration operation (operation S110) and broadcasts a done signal indicating a completion of the first impedance calibration operation to the slave dies 200b-200k through an impedance pad (operation S130).

Each of the slave dies 200b-200k receives the done signal through respective ones of impedance pads (operation S150) and performs a second impedance calibration operation sequentially based on the done signal and an identification signal that identifies each of the slave dies 200b-200k (operation S170).

Figure 17:
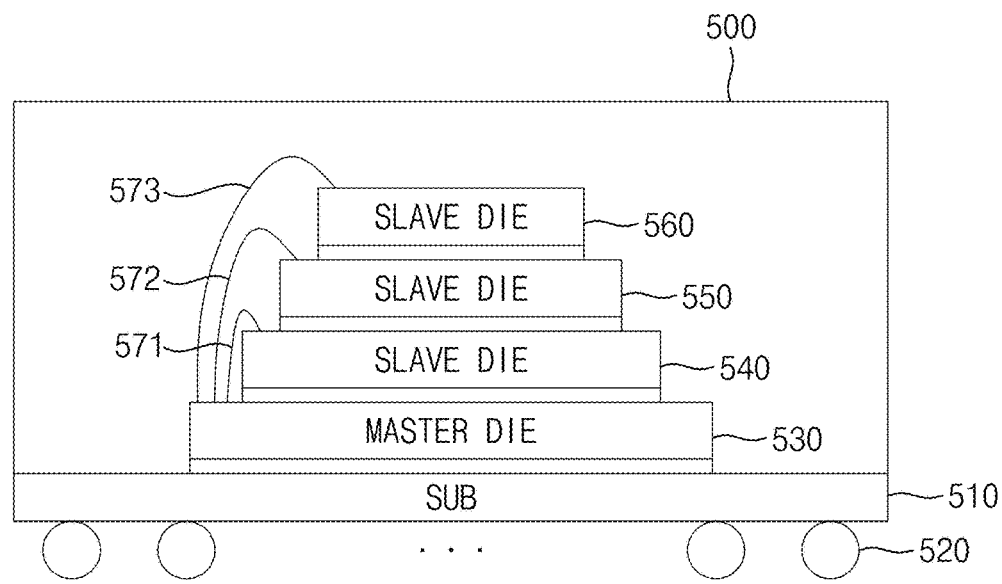
FIG. 17 is a schematic diagram of a multi-chip package including a semiconductor memory device according to some example embodiments.

FIG. 17 is a schematic diagram of a multi-chip package including a semiconductor memory device according to some example embodiments.

Referring to FIG. 17, a multi-chip package 500 may include a plurality of memory dies 530, 540, 550 and 560 which are sequentially stacked on a package substrate 510. The memory die 530 may be a master die and the memory dies 540, 550 and 560 may be slave dies. The master die 530 may have substantially the same configuration of the master die 200a in FIG. 10 and each of the slave dies 540, 550 and 560 may have substantially similar configuration of the slave die 200a in FIG. 12.

A through-silicon via (TSV) (not shown), a bonding wire (not shown), a bump (not shown), or a solder ball 520 may be used to electrically connect the memory dies 530, 540, 550 and 560 with one other.

Each of the memory dies 530, 540, 550 and 560 may employ an impedance calibration circuit. The master die 530 may employ the impedance calibration circuit 400, the ripple counter 380 and the identifier generator 390 in FIG. 8 and each of the slave dies 540, 550 and 560 may employ the impedance calibration circuit 400b, the ripple counter 380b and the identifier generator 390b in FIG. 12.

The master die 530 may be connected to the slave die 540 through a wire 571, may be connected to the slave die 550 through a wire 572 and may be connected to the slave die 560 through a wire 573.

Figure 18:
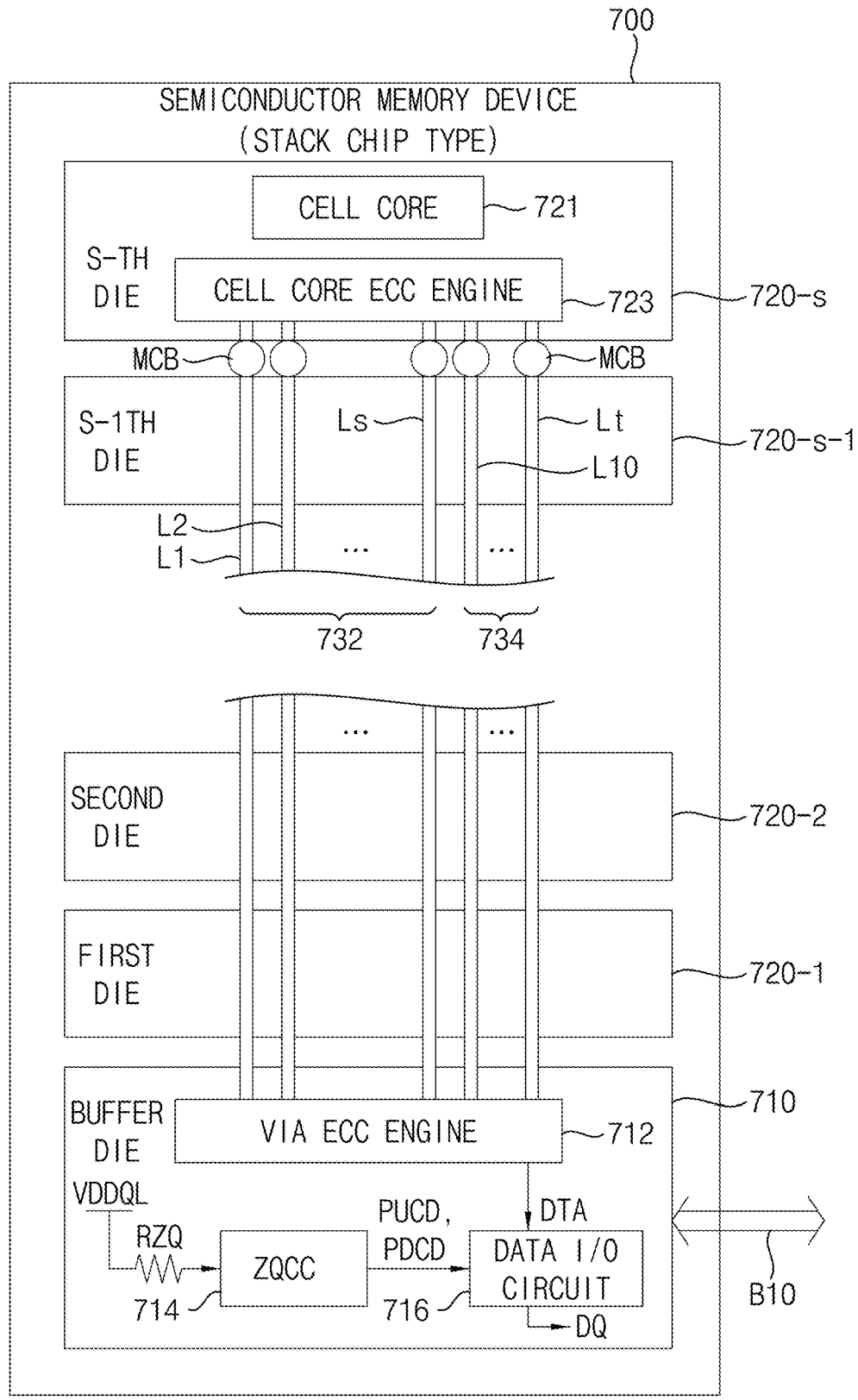
FIG. 18 is a block diagram illustrating a semiconductor memory device according to some example embodiments.

FIG. 18 is a block diagram illustrating a semiconductor memory device according to some example embodiments.

Figure 19:
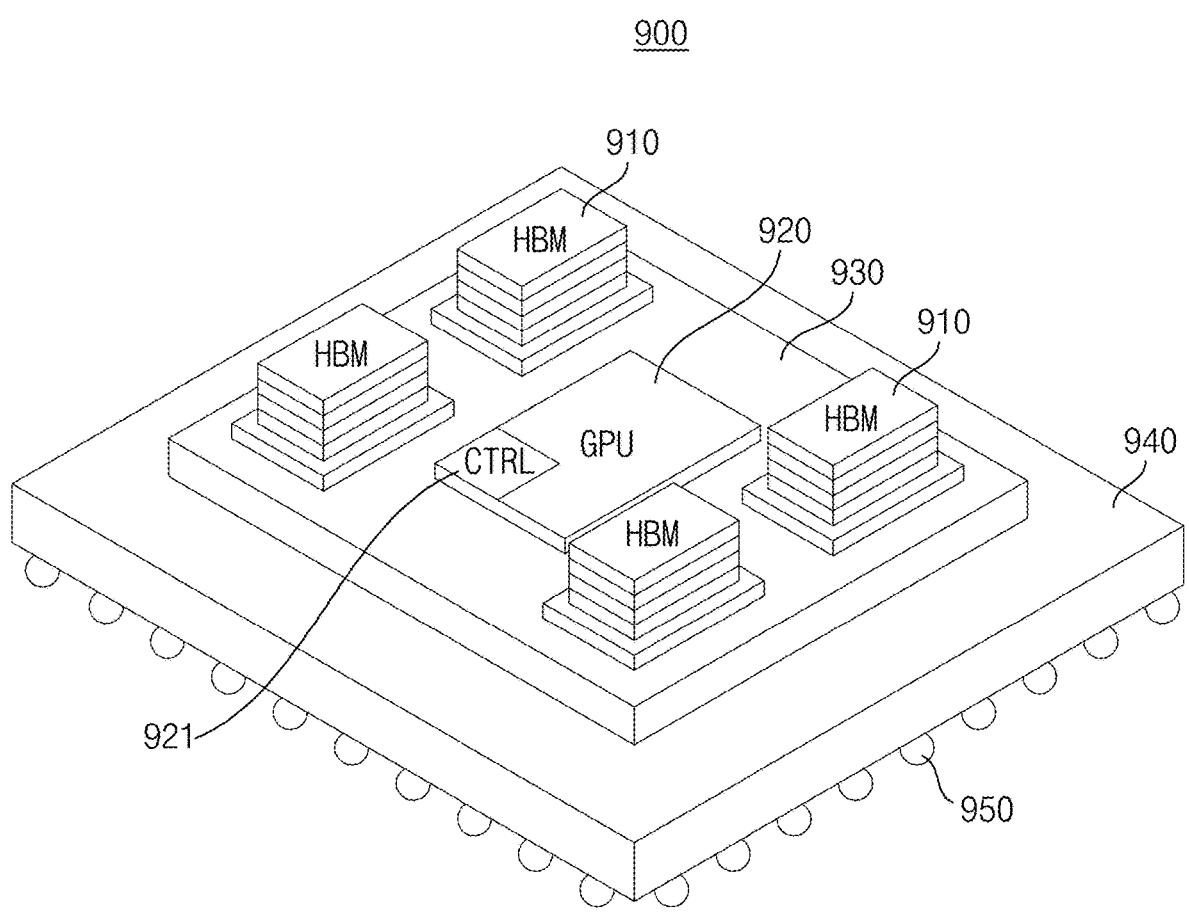
FIG. 19 is a configuration diagram illustrating a semiconductor package including the stacked memory device according to some example embodiments.

Referring to FIG. 19, a semiconductor memory device 700 may include at least one buffer die 710 and a plurality of memory dies 720-1 to 720-s (s is a natural number equal to or greater than three) providing a soft error analyzing and correcting function in a stacked chip structure.

The plurality of memory dies 720-1 to 720-s may be stacked on the buffer die 710, and may convey data through a plurality of through silicon via (TSV) lines.

Each of the memory dies 720-1 to 720-s may include cell core 721 to store data and a cell core ECC engine 723 to generate transmission parity bits (e.g., transmission parity data) based on transmission data to be sent to the at least one buffer die 710. The cell core 721 may include a plurality of memory cells having DRAM cell structure.

The buffer die 710 may include a via ECC engine 712, which may correct a transmission error using the transmission parity bits when a transmission error is detected from the transmission data received through the TSV lines, and generate error-corrected data.

The buffer die 710 may further include an impedance calibration circuit (ZQCC) 714 and a data I/O circuit 716. The impedance calibration circuit 714 may be connected to an external resistor RZQ coupled to the power supply voltage VDDQL.

The impedance calibration circuit 714 may employ the impedance calibration circuit 400 in FIG. 10. The impedance calibration circuit 714 may provide a pull-up control code PUCD and a pull-down control code PDCD to the data I/O circuit 716. The data I/O circuit 716 may drive a data DTA provided from the via ECC engine 712 based on the pull-up control code PUCD and the pull-down control code PDCD to transmit a data signal DQ having a target VOH voltage to an external memory controller (for example, the memory controller 30).

The semiconductor memory device 700 may be, e.g., a stack chip type memory device or a stacked memory device that conveys data and control signals through the TSV lines. The TSV lines may be also called 'through electrodes'.

The cell core ECC engine 723 may perform error correction on data that is output from the memory die 720-s before the transmission data is sent.

A transmission error that occurs at the transmission data may be due to, e.g., noise that occurs at the TSV lines. Since data fail due to the noise occurring at the TSV lines may be distinguishable from data fail due to a false operation of the memory die, it may be regarded as soft data fail (or a soft error). The soft data fail may be generated due to transmission fail on a transmission path, and may be detected and remedied by an ECC operation.

A data TSV line group 732, which is formed at each of the plurality of memory dies 720-1 to 720-s, may include TSV lines L1, L2 to Ls, and a parity TSV line group 734 may include TSV lines L10 to Lt.

The TSV lines L1, L2 to Ls of the data TSV line group 732 and the parity TSV lines L10 to Lt of the parity TSV line group 734 may be connected to micro bumps MCB, which are correspondingly formed among the memory dies 720-1 to 720-s.

The semiconductor memory device 700 may have a three-dimensional (3D) chip structure or a 2.5D chip structure to communicate with the host through a data bus B10. The buffer die 710 may be connected with the external memory controller through the data bus B10.

The cell core ECC engine 723 may output transmission parity bits as well as the transmission data through the parity TSV line group 734 and the data TSV line group 732 respectively. The output transmission data may be data that is error-corrected by the cell core ECC engine 723.

The via ECC engine 712 may determine whether a transmission error occurs at the transmission data received through the data TSV line group 732, based on the transmission parity bits received through the parity TSV line group 734. When a transmission error is detected, the via ECC engine 712 may correct the transmission error on the transmission data using the transmission parity bits. When the transmission error is uncorrectable, the via ECC engine 712 may output information indicating occurrence of an uncorrectable data error. When an error is detected from read data in a high bandwidth memory (HBM) or the stacked memory structure, the error may be an error occurring due to noise while data is transmitted through the TSV According to some example embodiments, as illustrated in FIG. 18, the cell core ECC engine 723 may be included in the memory die 720-s, and the via ECC engine 712 may be included in the buffer die 710. Accordingly, it may be possible to detect and correct soft data fail. The soft data fail may include a transmission error that is generated due to noise when data is transmitted through TSV lines.

FIG. 19 is a configuration diagram illustrating a semiconductor package including the stacked memory device according to some example embodiments.

Referring to FIG. 19, a semiconductor package 900 may include one or more stacked memory devices 910 and a graphic processing unit (GPU) 920.

The stacked memory devices 910 and the GPU 920 may be mounted on an interposer 930, and the interposer on which the stacked memory device 910 and the GPU 920 are mounted may be mounted on a package substrate 940 mounted on solder balls 950. The GPU 920 may correspond to a semiconductor device which may perform a memory control function, and for example, the GPU 920 may be implemented as an application processor (AP). The GPU 920 may include a memory controller CTRL 921.

The stacked memory device 910 may be implemented in various forms, and the stacked memory device 910 may be a memory device in a high bandwidth memory (HBM) form in which a plurality of layers are stacked. Accordingly, the stacked memory device 910 may include a buffer die and a plurality of memory dies and each of the plurality of memory dies include a cell core and a cell core ECC engine.

The plurality of stacked memory devices 910 may be mounted on the interposer 930, and the GPU 920 may communicate with the plurality of stacked memory devices 910. For example, each of the stacked memory devices 910 and the GPU 920 may include a physical region, and communication may be performed between the stacked memory devices 910 and the GPU 920 through the physical regions. When the stacked memory device 910 includes a direct access region, a test signal may be provided into the stacked memory device 910 through conductive means (e.g., solder balls 950) mounted under package substrate 940 and the direct access region.

Figure 20:
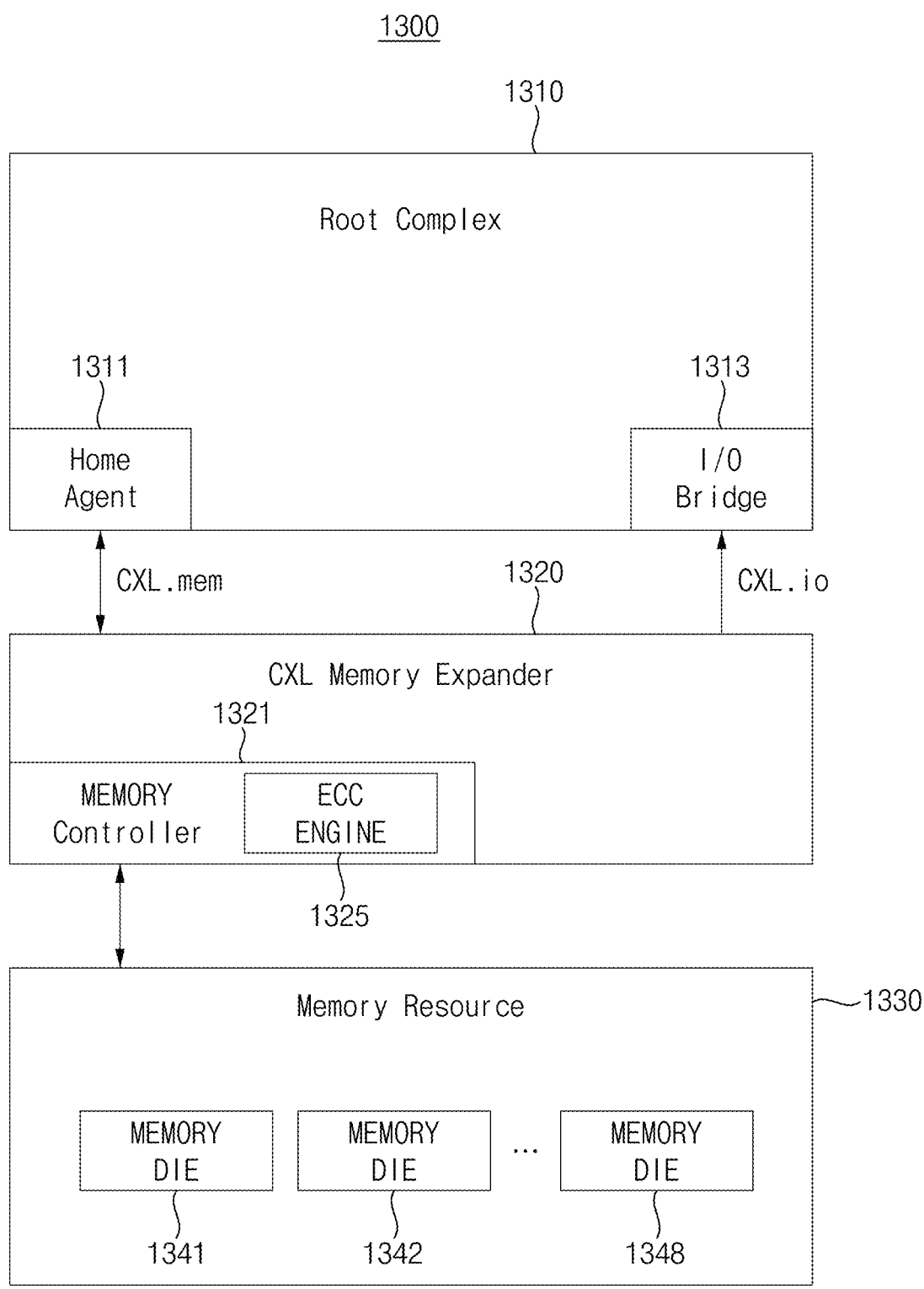
FIG. 20 is an example of a computing system when a memory system according to some example embodiments corresponds to a Type 3 memory system defined by a compute express link (CXL) protocol.

FIG. 20 is an example of a computing system when a memory system according to some example embodiments corresponds to a Type 3 memory system defined by a compute express link (CXL) protocol.

Referring to FIG. 20, a computing system 1300 may include a root complex 1310, a CXL memory expander 1320 connected to the root complex 1310 and a memory resource 1330. The memory resource 1330 may correspond to the semiconductor memory device 100 in FIG. 1.

The root complex 1310 may include a home agent 1311 and an I/O bridge 1313, and the home agent 1310 may communicate with the CXL memory expander 1320 based on a coherent protocol CXL.mem. The I/O bridge 1313 may communicate with the CXL memory expander 1320 based on a non-coherent protocol, e.g., an I/O protocol CXL.io. In a CXL protocol base, the home agent 1311 may correspond to an agent on a host side that is arranged to solve the entire consistency of the computing system 1300 for a given address.

The CXL memory expander 1320 may include a memory controller 1321 and the memory controller 1321 may employ the memory controller 30 in FIG. 1.

The CXL memory expander 1320 may output data to the root complex 1310 via the I/O bridge 1313 based on the I/O protocol CXL.io or the PCIe.

The memory resource 1330 may include a plurality of memory dies 1341, 1342, ... 1348 that are designated as a master die 1341 and slave dies 1342, ..., 1348. The master die 1341 and the slave dies 1342, ..., 1348 may be commonly connected to the external resistor RZQ through respective one of impedance pads and may perform the impedance calibration operation sequentially by communicating with each other through the impedance pads. Therefore, the master die 1341 and the slave dies 1342, ..., 1348 may limit and/or prevent degradation of power integrity due to board routing and electro-magnetic wave interference that may occur when communication pads are used for communicating between the master die 1341 and the slave dies 1342, ..., 1348 by performing the impedance calibration operation sequentially by communicating with each other through the impedance pads.

Some example embodiments may be applied to systems using semiconductor memory devices that include multi-dies. For example, embodiments may be applied to systems such as smart phones, navigation systems, notebook computers, desk top computers, and game consoles that use semiconductor memory devices as working memory.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, an application-specific integrated circuit (ASIC), etc.

While the present disclosure has been shown and described with reference to some example embodiments thereof, it will be apparent to those of ordinary skill in the art that many modifications in form and detail may be made thereto without materially departing from the spirit and scope of the present disclosure as set forth by the following claims.

What is claimed is:

1. A semiconductor memory device comprising:
an external resistor in a board; and
a plurality of memory dies mounted on the board and commonly connected to the external resistor, a first memory die from among the plurality of memory dies being designated as a master die and memory dies from among the plurality of memory dies other than the first memory die being designated as a plurality of slave dies,
wherein the master die comprises a first output driver and a first impedance pad, and the master die is configured to
perform a first impedance calibration operation to set a resistance of the first output driver and a first reference output high level (VOH) voltage of the first output driver, and
output a first done signal indicating a completion of the first impedance calibration operation to the plurality of slave dies through the first impedance pad connected to the external resistor, and
wherein each of the plurality of slave dies comprises a second output driver and a second impedance pad, each of the plurality of slave dies is configured to
receive the first done signal through the second impedance pad connected to the external resistor,
generate an identification signal based on the first done signal,
perform a second impedance calibration operation to set a resistance of the second output driver and a second reference VOH voltage of the second output driver based on the identification signal, and
output a second done signal indicating a completion of the second impedance calibration operation through the second impedance pad,
wherein a first slave die from among the plurality of slave dies is configured to perform the second impedance calibration operation based on a corresponding identification signal, and additional slave dies from among the plurality of slave dies other than the first slave die are configured to sequentially perform the second impedance calibration operation after the first slave die based on corresponding identification signals.

2. The semiconductor memory device of claim 1, wherein the master die is configured to perform the first impedance calibration operation in response to an impedance calibration command received from an external device.

3. The semiconductor memory device of claim 2, wherein each of the plurality of slave dies is configured to generate the identification signal based on a count signal that is based on the first done signal and a fuse signal designating respective ones of the plurality of slave dies.

4. The semiconductor memory device of claim 3, wherein the identification signal generated by each of the plurality of slave dies are activated sequentially.

5. The semiconductor memory device of claim 1, wherein the master die includes:
- a buffer circuit connected to the first impedance pad, the buffer circuit configured to generate a first identification signal based on an internal power supply voltage; and
- an impedance calibration circuit connected to the first impedance pad.

6. The semiconductor memory device of claim 5, wherein the impedance calibration circuit includes:
- a calibration controller configured to receive an impedance calibration command from a command decoder; and
- a calibration circuit connected to the external resistor through the first impedance pad, the calibration circuit configured to
   - perform the first impedance calibration operation in response to a calibration enable signal from the calibration controller to provide a pull-up control code and a pull-down control code to the first output driver, and
   - provide the calibration controller with a first comparison signal and a second comparison signal indicating that the first impedance calibration operation is completed,
- wherein the calibration controller is configured to output the first done signal to the plurality of slave dies through the first impedance pad based on the first comparison signal and the second comparison signal.

7. The semiconductor memory device of claim 6, wherein the calibration controller is configured to ignore the first identification signal and activate the calibration enable signal based on the impedance calibration command; and
- wherein the calibration circuit is configured to perform the first impedance calibration operation in response to activation of the calibration enable signal.

8. The semiconductor memory device of claim 6, wherein the calibration circuit includes:
- a first code generator configured to generate the pull-up control code by comparing a first target VOH voltage with a first voltage at a first node between a pull-up driver and a first replica pull-down driver;
- a first code storing circuit configured to store the pull-up control code when the first target VOH voltage is same as the first voltage;
- a second code generator configured to generate the pull-down control code by comparing the first target VOH voltage with a second voltage at a second node connected to the first impedance pad; and
- a second code storing circuit configured to store the pull-down control code when the first target VOH voltage is same as the second voltage.

9. The semiconductor memory device of claim 6, wherein the master die further includes a data output circuit configured to output a data signal by driving data based on the pull-up control code and the pull-down control code, and
the data output circuit includes the first output driver.

10. The semiconductor memory device of claim 1, wherein each of the plurality of slave dies further includes:
- a level shifter connected to the second impedance pad, the level shifter configured to output a shifted voltage by shifting a voltage at the second impedance pad;
- a ripple counter connected to an internal power supply voltage, the ripple counter configured to generate a counting signal by performing a counting operation based on the shifted voltage;
- a fuse set in which fuse information associated with a respective one of the plurality of slave dies is programmed, the fuse set configured to output the fuse information that is programmed as a fuse signal;
- an identifier generator configured to generate the identification signal that identifies the respective one of the plurality of slave dies based on the fuse signal and the counting signal; and
- an impedance calibration circuit connected to the second impedance pad.

11. The semiconductor memory device of claim 10, wherein
- the plurality of slave dies include the first slave die, a second slave die and a third slave die,
- the ripple counter includes a first D-flipflop, a second D-flipflop and a third D-flipflop;
- the first D-flipflop includes a first data terminal connected to the internal power supply voltage, a first clock terminal connected to the shifted voltage and a first output terminal;
- the second D-flipflop includes a second data terminal connected to the first output terminal of the first D-flipflop, a second clock terminal connected to the shifted voltage and a second output terminal;
- the third D-flipflop includes a third data terminal connected to the second output terminal of the second D-flipflop, a third clock terminal connected to the shifted voltage and an third output terminal; and
- the counting signal is provided at the first output terminal, the second output terminal and the third output terminal of the first D-flipflop, the second D-flipflop and the third D-flipflop.

12. The semiconductor memory device of claim 11, wherein the identifier generator includes:
- a first AND gate configured to output a first bit of the identification signal by performing an AND operation on a first bit of the counting signal and a first bit of the fuse signal, the first bit of the counting signal being provided at the first output terminal of the first D-flipflop;
- a second AND gate configured to output a second bit of the identification signal by performing an AND operation on a second bit of the counting signal and a second bit of the fuse signal, the second bit of the counting signal being provided at the second output terminal of the second D-flipflop; and
- a third AND gate configured to output a third bit of the identification signal by performing an AND operation on a third bit of the counting signal and a third bit of the fuse signal, the third bit of the counting signal being provided at the third output terminal of the third D-flipflop.

13. The semiconductor memory device of claim 12, wherein
- when the first bit of the fuse signal is a logic high level and each of the second bit and the third bit of the fuse signal is a logic low level, the fuse signal designates the first slave die;
- when the second bit of the fuse signal is the logic high level and each of the first bit and the third bit of the fuse signal is the logic low level, the fuse signal designates the second slave die; and
- when the third bit of the fuse signal is the logic high level and each of the first bit and the second bit of the fuse signal is the logic low level, the fuse signal designates the third slave die.

14. The semiconductor memory device of claim 10, wherein the impedance calibration circuit includes:
a calibration controller configured to receive the identification signal from the identifier generator; and
a calibration circuit connected to the external resistor through the second impedance pad, the calibration circuit configured to perform the second impedance calibration operation in response to a calibration enable signal from the calibration controller to provide a pull-up control code and a pull-down control code to the second output driver.

15. The semiconductor memory device of claim 14, wherein the calibration controller is configured to activate the calibration enable signal in response to an activation of the identification signal; and
wherein the calibration circuit is configured to perform the second impedance calibration operation in response to an activation of the calibration enable signal.

16. The semiconductor memory device of claim 1, wherein the master die is configured to perform the first impedance calibration operation as a background impedance calibration operation in response to a mode register set signal that is internally generated by the master die.

17. The semiconductor memory device of claim 1, wherein:
the master die is mounted on the board;
the plurality of slave dies are stacked on the master die; and
the master die is connected to respective ones of the plurality of slave dies through respective ones of a plurality of wires.

18. A memory system comprising:
a semiconductor memory device including a plurality of memory dies; and
a memory controller configured to control the semiconductor memory device,
wherein the semiconductor memory device includes:
an external resistor in a board; and
the plurality of memory dies mounted on the board and commonly connected to the external resistor, a first memory die from among the plurality of memory dies being designated as a master die and memory dies from among the plurality of memory dies other than the first memory die being designated as a plurality of slave dies,
wherein the master die comprises a first output driver and a first impedance pad, and the master die is configured to
perform a first impedance calibration operation to set a resistance of the first output driver and a first reference output high level (VOH) voltage of the first output driver, and
output a first done signal indicating a completion of the first impedance calibration operation to the plurality of slave dies through the first impedance pad connected to the external resistor, and
wherein each of the plurality of slave dies comprises a second output driver and a second impedance pad, each of the plurality of slave dies is configured to
receive the first done signal through the second impedance pad connected to the external resistor,
generate an identification signal based on the first done signal, perform a second impedance calibration operation to set a resistance of the second output driver and a second reference VOH voltage of the second output driver based on the identification signal, and
output a second done signal indicating a completion of the second impedance calibration operation through the second impedance pad,
wherein a first slave die from among the plurality of slave dies is configured to perform the second impedance calibration operation based on a corresponding identification signal, and second slave dies from among the plurality of slave dies other than the first slave die are configured to sequentially perform the second impedance calibration operation after the first slave die based on corresponding identification signals.

19. The memory system of claim 18,
wherein the master die includes a first impedance calibration circuit connected to the first impedance pad, the first impedance calibration circuit configured to perform the first impedance calibration operation in response to an impedance calibration command from the memory controller, and
wherein each of the plurality of slave dies includes
a level shifter connected to the second impedance pad, the level shifter configured to output a shifted voltage by shifting a voltage at the second impedance pad,
a ripple counter connected to an internal power supply voltage, the ripple counter configured to output a counting signal by performing a counting operation based on the shifted voltage,
a fuse set in which fuse information associated with a respective one of the plurality of slave dies is programmed, the fuse set configured to output the fuse information that is programmed as a fuse signal,
an identifier generator configured to generate the identification signal that identifies the respective one of the plurality of slave dies based on the fuse signal and the counting signal, and
a second impedance calibration circuit connected to the second impedance pad, the second impedance calibration circuit configured to perform the second impedance calibration operation.

20. A semiconductor memory device comprising:
an external resistor in a board; and
a plurality of memory dies mounted on the board and commonly connected to the external resistor, a first memory die from among the plurality of memory dies being designated as a master die and memory dies from among the plurality of memory dies other than the first memory die being designated as a plurality of slave dies,
wherein the master die comprises a first output driver and a first impedance pad, and the master die is configured to
perform a first impedance calibration operation to set a resistance of the first output driver and a first reference output high level (VOH) voltage of the first output driver, and
output a first done signal indicating a completion of the first impedance calibration operation to the plurality of slave dies through the first impedance pad connected to the external resistor, wherein each of the plurality of slave dies comprises a second output driver and a second impedance pad, each of the plurality of slave dies is configured to
receive the first done signal through the second impedance pad connected to the external resistor,
generate an identification signal based on the first done signal,
perform a second impedance calibration operation to set a resistance of the second output driver and a second reference VOH voltage of the second output driver based on the identification signal, and
output a second done signal indicating a completion of the second impedance calibration operation through the second impedance pad,
wherein a first slave die from among the plurality of slave dies is configured to perform the second impedance calibration operation based on a corresponding identification signal, and second slave dies from among the plurality of slave dies other than the first slave die are configured to sequentially perform the second impedance calibration operation after the first slave die based on corresponding identification signals, and wherein each of the plurality of slave dies includes
a level shifter connected to the second impedance pad, the level shifter configured to output a shifted voltage by shifting a voltage at the second impedance pad,
a ripple counter connected to an internal power supply voltage, the ripple counter configured to output a counting signal by performing a counting operation based on the shifted voltage,
a fuse set in which fuse information associated with a respective one of the plurality of slave dies is programmed, the fuse set configured to output the fuse information that is programmed as a fuse signal,
an identifier generator configured to generate the identification signal that identifies the respective one of the plurality of slave dies based on the fuse signal and the counting signal, and
an impedance calibration circuit connected to the second impedance pad, the impedance calibration circuit configured to perform the second impedance calibration operation.

* * * * *